US010865615B2

(12) United States Patent
Orban

(10) Patent No.: US 10,865,615 B2
(45) Date of Patent: Dec. 15, 2020

(54) INSTRUMENT LINE FOR INSERTION IN A DRILL STRING OF A DRILLING SYSTEM

(71) Applicant: Schlumberger Technology Corporation, Sugar Land, TX (US)

(72) Inventor: Jacques Orban, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 108 days.

(21) Appl. No.: 15/097,587

(22) Filed: Apr. 13, 2016

(65) Prior Publication Data

US 2016/0298442 A1    Oct. 13, 2016

Related U.S. Application Data

(60) Provisional application No. 62/146,731, filed on Apr. 13, 2015, provisional application No. 62/146,877, filed on Apr. 13, 2015, provisional application No. 62/147,139, filed on Apr. 14, 2015.

(51) Int. Cl.
*E21B 23/02* (2006.01)
*E21B 44/00* (2006.01)
*E21B 47/12* (2012.01)
*E21B 3/02* (2006.01)
*E21B 33/072* (2006.01)
*E21B 47/13* (2012.01)

(52) U.S. Cl.
CPC ............... *E21B 23/02* (2013.01); *E21B 3/02* (2013.01); *E21B 33/072* (2013.01); *E21B 44/00* (2013.01); *E21B 47/13* (2020.05)

(58) Field of Classification Search
CPC .. E21B 23/02–06; E21B 33/02; E21B 33/072; E21B 44/00; E21B 47/122; E21B 17/028
See application file for complete search history.

(56) References Cited

U.S. PATENT DOCUMENTS

| | | | |
|---|---|---|---|
| 2,557,168 A | 6/1951 | Arps et al. |
| 2,677,427 A | 5/1954 | McKinney |
| 2,906,342 A | 9/1959 | Russell |
| 2,963,092 A | 12/1960 | Anderson |
| 3,167,707 A | 1/1965 | Oliver |
| 3,363,880 A | 1/1968 | Blagg |
| 4,003,435 A | 1/1977 | Cullen et al. |
| 4,090,573 A | 5/1978 | Rankin |

(Continued)

FOREIGN PATENT DOCUMENTS

| | | |
|---|---|---|
| CA | 2891162 A1 | 5/2014 |
| CA | 2914552 A1 | 12/2014 |

(Continued)

*Primary Examiner* — Nicole Coy
(74) *Attorney, Agent, or Firm* — Rachel E. Greene

(57) ABSTRACT

An apparatus for delivering tools within a drill string may include an instrument line including a mechanically resistant external structure with an internal cavity. The instrument line may be configured to be deployed into the drill string. The apparatus may include one or more isolated wires positioned within the internal cavity. The apparatus may also include one or more tools removably coupled to the instrument line and positionable within the drill string. The one or more tools may be configured to provide measurements of conditions within a wellbore via the one or more isolated wires.

12 Claims, 16 Drawing Sheets

(56) References Cited

U.S. PATENT DOCUMENTS

| | | | |
|---|---|---|---|
| 4,126,848 A | 11/1978 | Denison | |
| 4,143,721 A | 3/1979 | Zuvela et al. | |
| 4,153,120 A | 5/1979 | Zuvela et al. | |
| 4,325,438 A | 4/1982 | Zuvela | |
| 4,331,203 A | 5/1982 | Kiefer | |
| 4,578,675 A | 3/1986 | MacLeod | |
| 4,689,775 A | 8/1987 | Scherbatskoy | |
| 4,739,325 A | 4/1988 | MacLeod | |
| 4,857,831 A | 8/1989 | Davies et al. | |
| 4,965,774 A | 10/1990 | Ng et al. | |
| 5,095,993 A | 3/1992 | Huber et al. | |
| 5,107,705 A | 4/1992 | Wraight et al. | |
| 5,305,830 A | 4/1994 | Wittrisch | |
| 5,426,368 A | 6/1995 | Benimeli et al. | |
| 5,468,153 A | 11/1995 | Brown et al. | |
| 5,735,351 A | 4/1998 | Helms | |
| 5,823,257 A * | 10/1998 | Peyton | E21B 17/028 166/65.1 |
| 5,881,310 A | 3/1999 | Airhart et al. | |
| 6,138,756 A | 10/2000 | Dale | |
| 6,250,402 B1 | 6/2001 | Brune et al. | |
| 6,341,654 B1 | 1/2002 | Wilson et al. | |
| 6,396,276 B1 | 5/2002 | Van Steenwyk et al. | |
| 7,377,317 B2 * | 5/2008 | Radzinski | E21B 47/011 166/250.01 |
| 8,044,819 B1 | 10/2011 | Bessiere et al. | |
| 8,474,548 B1 | 7/2013 | Young et al. | |
| 8,863,861 B2 | 10/2014 | Zientarski | |
| 9,512,716 B2 | 12/2016 | Liu et al. | |
| 9,638,028 B2 | 5/2017 | Gao et al. | |
| 9,759,830 B2 | 9/2017 | Andrews et al. | |
| 9,765,613 B2 | 9/2017 | Cramer et al. | |
| 10,119,393 B2 * | 11/2018 | Derkacz | E21B 47/122 |
| 2001/0022239 A1 | 9/2001 | Brune et al. | |
| 2002/0070030 A1 | 6/2002 | Smith et al. | |
| 2002/0070033 A1 * | 6/2002 | Headworth | E21B 17/01 166/384 |
| 2002/0096364 A1 | 7/2002 | Brune et al. | |
| 2003/0136583 A1 | 7/2003 | Brune et al. | |
| 2004/0084218 A1 | 5/2004 | Brune et al. | |
| 2005/0046588 A1 | 3/2005 | Wisler et al. | |
| 2005/0052949 A1 | 3/2005 | Gaston et al. | |
| 2005/0115708 A1 | 6/2005 | Jabusch | |
| 2005/0150689 A1 | 7/2005 | Jogi et al. | |
| 2006/0119364 A1 | 6/2006 | Chen et al. | |
| 2006/0124355 A1 | 6/2006 | Brune et al. | |
| 2007/0056722 A1 | 3/2007 | Angman et al. | |
| 2007/0181304 A1 | 8/2007 | Rankin et al. | |
| 2007/0215343 A1 | 9/2007 | McDonald et al. | |
| 2007/0247328 A1 | 10/2007 | Petrovic et al. | |
| 2008/0006400 A1 | 1/2008 | Coyle | |
| 2008/0066905 A1 | 3/2008 | Aivalis et al. | |
| 2008/0156477 A1 | 7/2008 | Aivalis et al. | |
| 2008/0159077 A1 | 7/2008 | Madhavan et al. | |
| 2008/0196904 A1 | 8/2008 | Angman et al. | |
| 2008/0216554 A1 | 9/2008 | McKee | |
| 2008/0230216 A1 | 9/2008 | Angman | |
| 2008/0271924 A1 | 11/2008 | Lurie et al. | |
| 2009/0012711 A1 | 1/2009 | Harmon | |
| 2009/0038850 A1 | 2/2009 | Brune et al. | |
| 2009/0255730 A1 | 10/2009 | Brune et al. | |
| 2009/0277631 A1 | 11/2009 | Minto et al. | |
| 2009/0321174 A1 | 12/2009 | Endo et al. | |
| 2010/0065329 A1 | 3/2010 | Zientarski | |
| 2010/0206544 A1 | 8/2010 | Dowling et al. | |
| 2010/0328096 A1 | 12/2010 | Hache et al. | |
| 2011/0005767 A1 | 1/2011 | Muff et al. | |
| 2011/0277990 A1 * | 11/2011 | Kotsonis | E21B 4/18 166/217 |
| 2011/0280104 A1 | 11/2011 | McClung | |
| 2011/0315445 A1 | 12/2011 | Runia et al. | |
| 2012/0068528 A1 | 3/2012 | Grief et al. | |
| 2012/0085582 A1 | 4/2012 | Brune et al. | |
| 2012/0197528 A1 | 8/2012 | Le et al. | |
| 2012/0230151 A1 * | 9/2012 | Almaguer | E21B 7/061 367/86 |
| 2013/0068528 A1 | 3/2013 | Gray | |
| 2013/0118807 A1 | 5/2013 | Yang | |
| 2014/0121974 A1 | 5/2014 | Itskovich | |
| 2014/0131103 A1 | 5/2014 | Brune et al. | |
| 2014/0190686 A1 | 7/2014 | Cannan et al. | |
| 2014/0265565 A1 * | 9/2014 | Cooley | H02P 6/18 307/18 |
| 2014/0308105 A1 | 10/2014 | Soertveit et al. | |
| 2015/0012217 A1 | 1/2015 | Legendre | |
| 2015/0070185 A1 | 3/2015 | Schulz et al. | |
| 2015/0090459 A1 | 4/2015 | Cain et al. | |
| 2015/0247399 A1 | 9/2015 | Doelalikar et al. | |
| 2015/0300161 A1 | 10/2015 | Kamata | |
| 2015/0337650 A1 | 11/2015 | Balogh et al. | |
| 2016/0061027 A1 | 3/2016 | Gao et al. | |
| 2016/0138390 A1 | 5/2016 | Arntsen et al. | |
| 2016/0291192 A1 | 10/2016 | Cuevas et al. | |
| 2016/0298441 A1 | 10/2016 | Orban | |
| 2016/0298442 A1 | 10/2016 | Orban | |
| 2016/0298449 A1 | 10/2016 | Orban | |
| 2017/0097441 A1 | 4/2017 | Eiskamp | |
| 2017/0111112 A1 | 4/2017 | San Martin et al. | |
| 2018/0045559 A1 | 2/2018 | Hawthorn et al. | |
| 2018/0156023 A1 | 6/2018 | Dykstra et al. | |

FOREIGN PATENT DOCUMENTS

| | | |
|---|---|---|
| WO | 2004086093 A1 | 10/2004 |
| WO | 2005064114 A1 | 7/2005 |
| WO | 2009085348 A2 | 7/2009 |
| WO | 2012058296 A2 | 5/2012 |

* cited by examiner

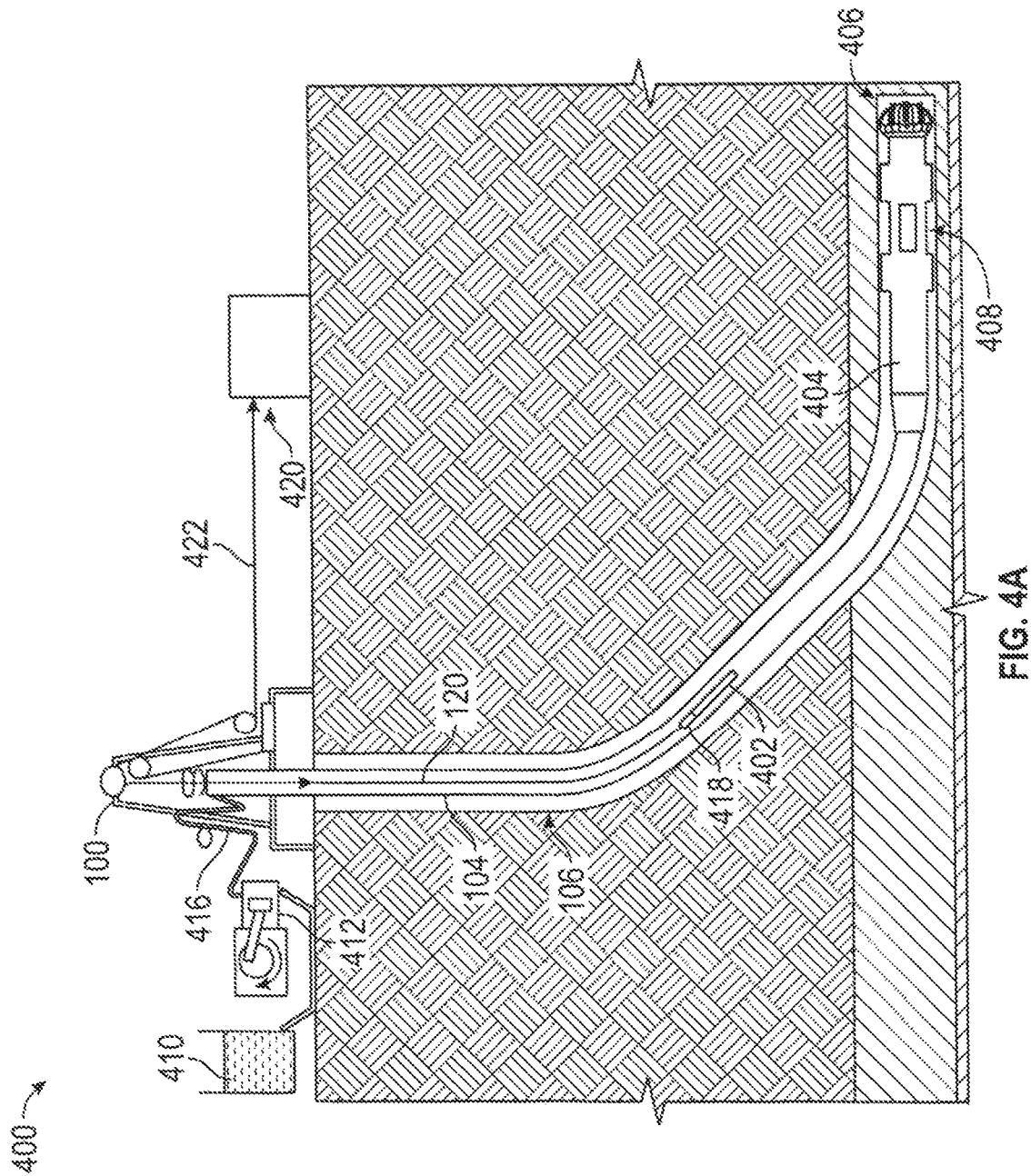

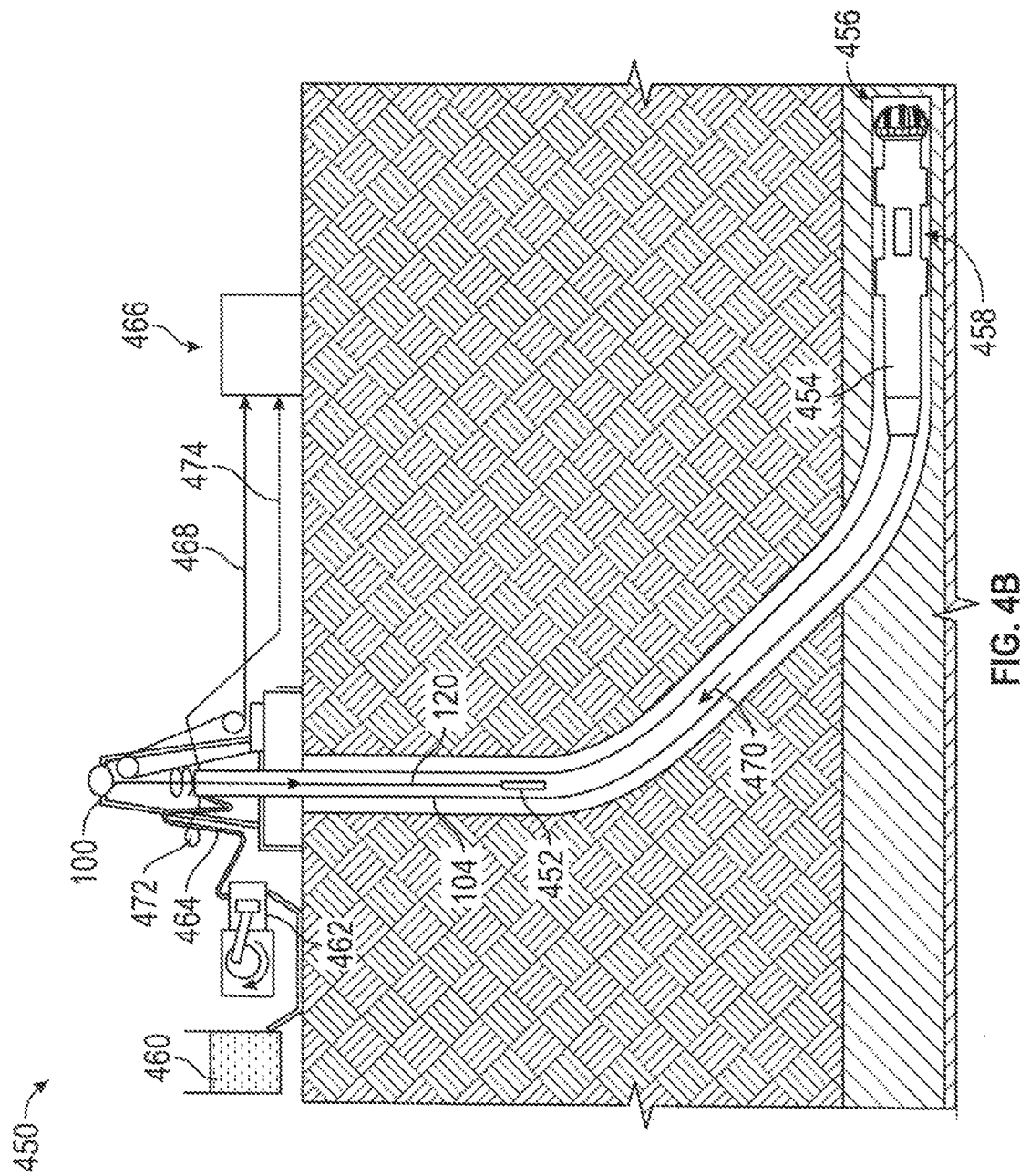

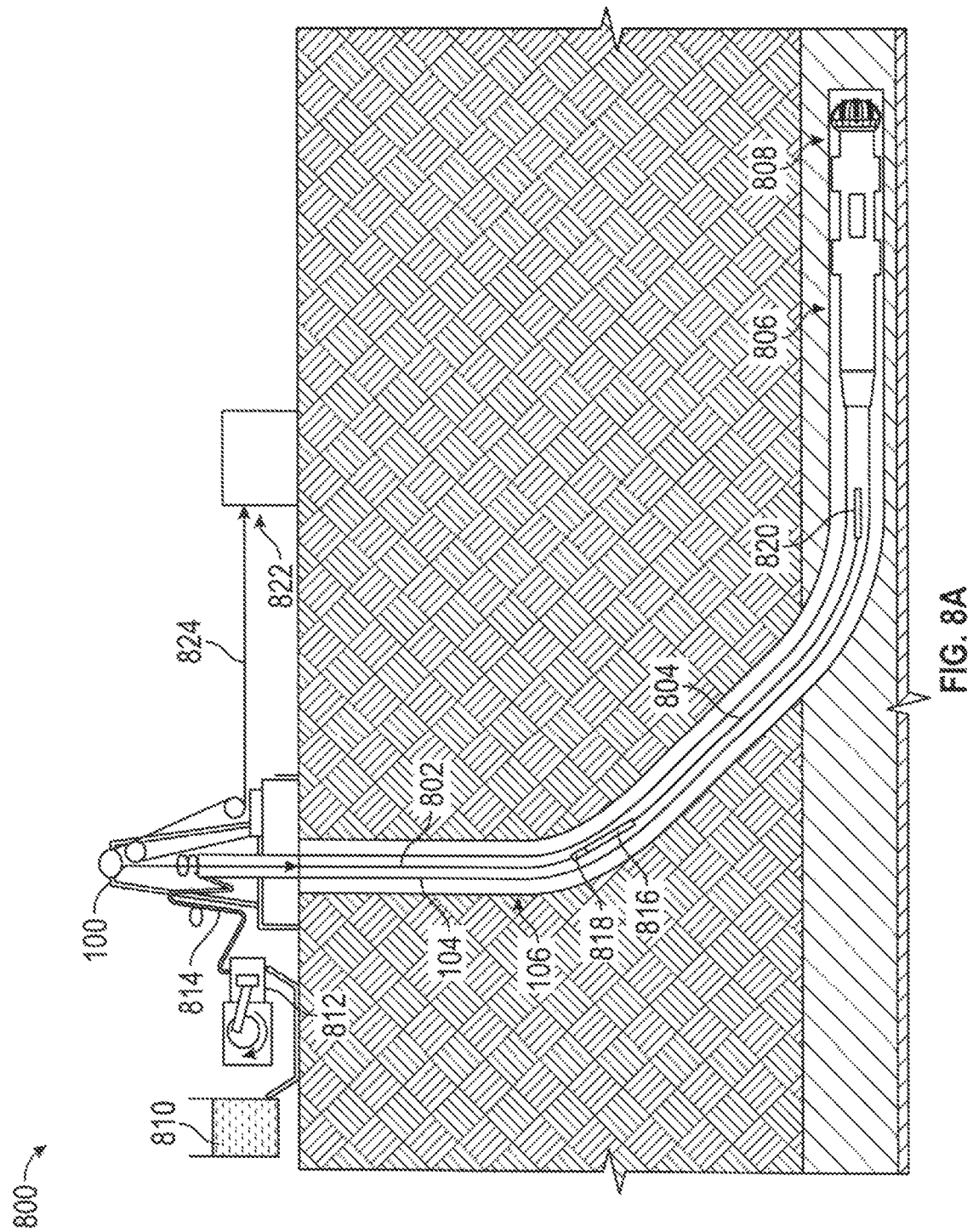

INSTRUMENT LINE FOR INSERTION IN A DRILL STRING OF A DRILLING SYSTEM

CROSS-REFERENCE TO RELATED APPLICATIONS

This application claims priority to U.S. Provisional Application having Ser. No. 62/146,731, which was filed on Apr. 13, 2015, U.S. Provisional Application having Ser. No. 62/146,877, which was filed on Apr. 13, 2015, and U.S. Provisional Application having Ser. No. 62/147,139, which was filed on Apr. 14, 2015. Each of these priority provisional applications is incorporated herein by reference in its entirety.

BACKGROUND

During drilling, information is sometimes transmitted to the surface from instruments within the wellbore, and/or from the surface to downhole instruments. For example, signals may be transmitted to or from measuring-while-drilling (MWD) equipment, logging-while-drilling (LWD) equipment, steering equipment, or other equipment. Such information may assist operators in the task of efficiently drilling a wellbore by providing information related to tool-face orientation and/or formation composition, and allowing commands and configuration of the downhole instruments, among other possible uses.

The drill string may extend thousands of feet, and transmitting data over this distance, below the surface, may present challenges. One way such transmission has been effected is through the use of mud-pulse telemetry. In mud-pulse telemetry, a pressure spike or modulated sine wave representing a bit of data is generated in the drilling mud from a mud-pulse generator in the drill string. The pressure spike or modulated sine wave is detected by a pressure sensor at or near the surface, allowing bits of data to be related through the mud. While this communication technique has proven effective, the transmission rate may be relatively slow, on the order of single digit bits-per-minute. Moreover, the signal-to-noise ratio can be low, because the pressure spike or modulated sine wave may be attenuated once it reaches the surface. Furthermore, the noise may high due to the proximity of machinery, such as mud pumps.

Electromagnetic ("e-mag") signal transmission has also been employed. In such communication, an electromagnetic signal is generated in the downhole equipment, which travels through the formation and is detected by sensors (e.g., voltmeters) at the surface, and then returns through the drill pipe to the source, completing the circuit. However, the effectiveness of this type of signal transmission depends partially on the formation properties. If, for example, the wellbore penetrates a salt layer, the electromagnetic transmissions may be unable to reach the surface at proper amplitude.

Various other types of downhole communication have also been proposed and/or implemented. Wired drill pipe, for example, has been proposed, and has the potential to obviate the challenges experienced with wireless signal transmission. However, because each pipe includes a wire connector that is prone to failure, if one connector in one pipe among the potentially thousands of pipes fails, the entire assembly can be rendered inoperative.

SUMMARY

Embodiments of the disclosure may provide an apparatus for delivering tools within a drill string. The apparatus may include an instrument line including a mechanically resistant external structure with an internal cavity. The instrument line may be configured to be deployed into the drill string. The apparatus may include one or more isolated wires positioned within the internal cavity. The apparatus may also include one or more tools removably coupled to the instrument line and positionable within the drill string. The one or more tools may be configured to provide measurements of conditions within a wellbore via the one or more isolated wires.

Embodiments of the disclosure may also include a junction module for coupling sections of an instrument line positioned within a drill string. The junction module may include an upper connection coupled to a first section of the instrument line. The junction module may also include a swivel coupled to the upper connection. The junction module may include a main compartment coupled to the junction swivel. The main compartment may include one or more of mechanical devices, electronics, sensors, and actuators. The junction module may also include an anchor section coupled to the main compartment. The anchor section may be configured to anchor at least one of the first section or the second section within the drill string. The junction module may include a lower connection coupled to the second section of the instrument line.

Embodiments of the disclosure may include a method for deploying an instrument line into a drill string in a wellbore. The method may include receiving an installation device coupled to the instrument line into a drilling device through an entry port. The method may include sealing the entry port using a sealing device coupled to the drilling device. The method may include drilling at least a portion of the wellbore using the drilling device, the drilling device being connected to the drill string. The method may include lowering the installation device and the instrument line through the drill string while drilling the wellbore and while sealing the entry port.

The foregoing summary is not intended to be exhaustive, but is provided merely to introduce a subset of the aspects of the present disclosure. These and other aspects are presented in greater detail below

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 4A and 4B illustrate conceptual, side, schematic views of a well site including the drilling rig, in which various downhole instruments may be used, according to an embodiment.

FIGS. 8A and 8B illustrate conceptual, side, schematic views of a well site including the drilling rig, in which multiple instrument lines may be used, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
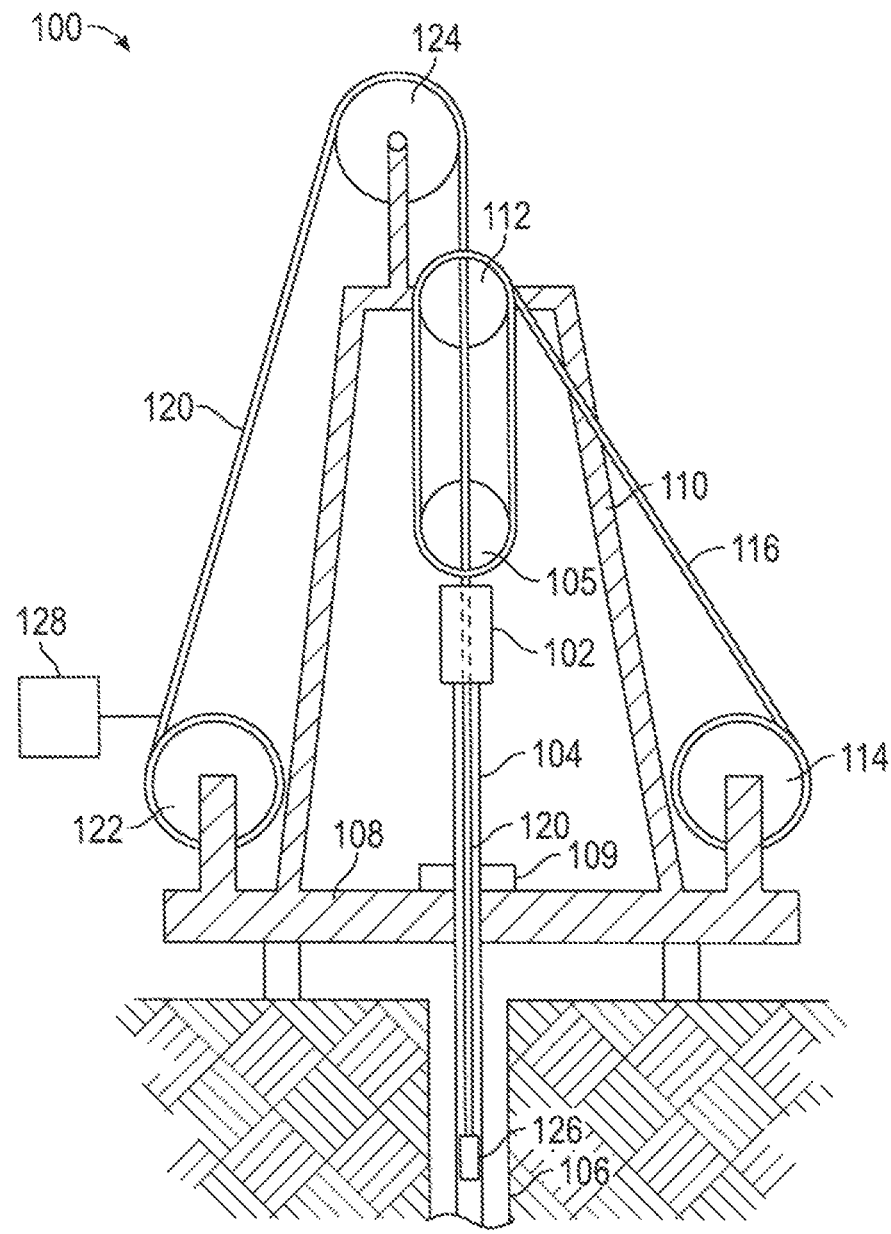
FIG. 1 illustrates a simplified, schematic view of a drilling rig system, according to an embodiment.

FIG. 1 illustrates a schematic view of a drilling rig 100, according to an embodiment. The drilling rig 100 includes a drilling apparatus 102 and a drill string 104 coupled thereto. The drilling apparatus 102 may include any type of drilling device, such as a top drive to support and rotate the drill string 104 or any other device configured to support, lower, and rotate the drill string 104, which may be deployed into a wellbore 106. In the illustrated embodiment, the drilling apparatus 102 may also include a travelling block 105, which may include of one or more rotating sheaves.

The drilling rig 100 may also include a rig floor 108, from which a support structure (e.g., including a mast) 110 may extend. A slips assembly 109 may be disposed at the rig floor 108, and may be configured to engage the drill string 104 so as to enable a new stand of tubulars to be added to the drill string 104 via the drilling apparatus 102.

A crown block 112 may be coupled to the support structure 110. Further, a drawworks 114 may be coupled to the rig floor 108. A drill line 116 may extend between the drawworks 114 and the crown block 112, and may be received through the sheaves of the travelling block 105. Accordingly, the position of the drilling apparatus 102 may be changed (e.g., raised or lowered) by spooling or unspooling the drilling line 116 from the drawworks 114, e.g., by rotation of the drawworks 114.

The drilling rig 100 may also include an instrument line 120, which may be received through the drilling apparatus 102 and into the drill string 104. The instrument line 120 may be spooled on an instrument line spool 122, and may be received at least partially around a line sheave 124 between the instrument line spool 122 and the drilling apparatus 102. In an embodiment, the instrument line spool 122 may be coupled to the rig floor 108 as shown, but in other embodiments, may be positioned anywhere on the rig 100 or in proximity thereto. Furthermore, in some embodiments, the line sheave 124 may be installed below the crown block 112. It may also be installed on the side of the crown-block 112. In such an embodiment, a guide may be installed above the entry port 220 to align the instrument line 120 from the sheave 124 with the bore of the shaft 204 and the drill-sting 104. In another embodiment, the sheave 124 can be attached directly onto the drilling apparatus 102. In such an embodiment, the spooling of the line spool 122 may be synchronize with the rotation of the drawworks 114.

The instrument line 120 may be connected to a downhole instrument 126, which may be deployed into the interior of the drill string 104, as will be described in greater detail below. The drill string 104 may be rotated while the instrument line 120 is deployed in the drill string 104. The rotation may induce twisting of the instrument line 120. Accordingly, the instrument 126 and/or a lower portion of the instrument line 120 may, in some embodiments, include a swivel, allowing for relative rotation between the instrument 126 and the instrument line 120. In such an embodiment, the instrument 126 may also be connected to the rotating drill string 104.

In an embodiment, the position of the downhole instrument 126 may be changed (e.g., raised or lowered) by spooling or unspooling the instrument line 120 from the instrument line spool 122. The downhole instrument 126 may be any type of instrument, such as a logging device, which may include one or more geophones, acoustic receivers, torque sensors, strain gauges, accelerometers, gyroscope, current probe, voltmeters, and/or the like. Further, the instrument line 120 may provide for wired communication with a controller 128, e.g., without calling for wires to be formed as a part of the drill pipe making up the drill string 104.

Figure 2:
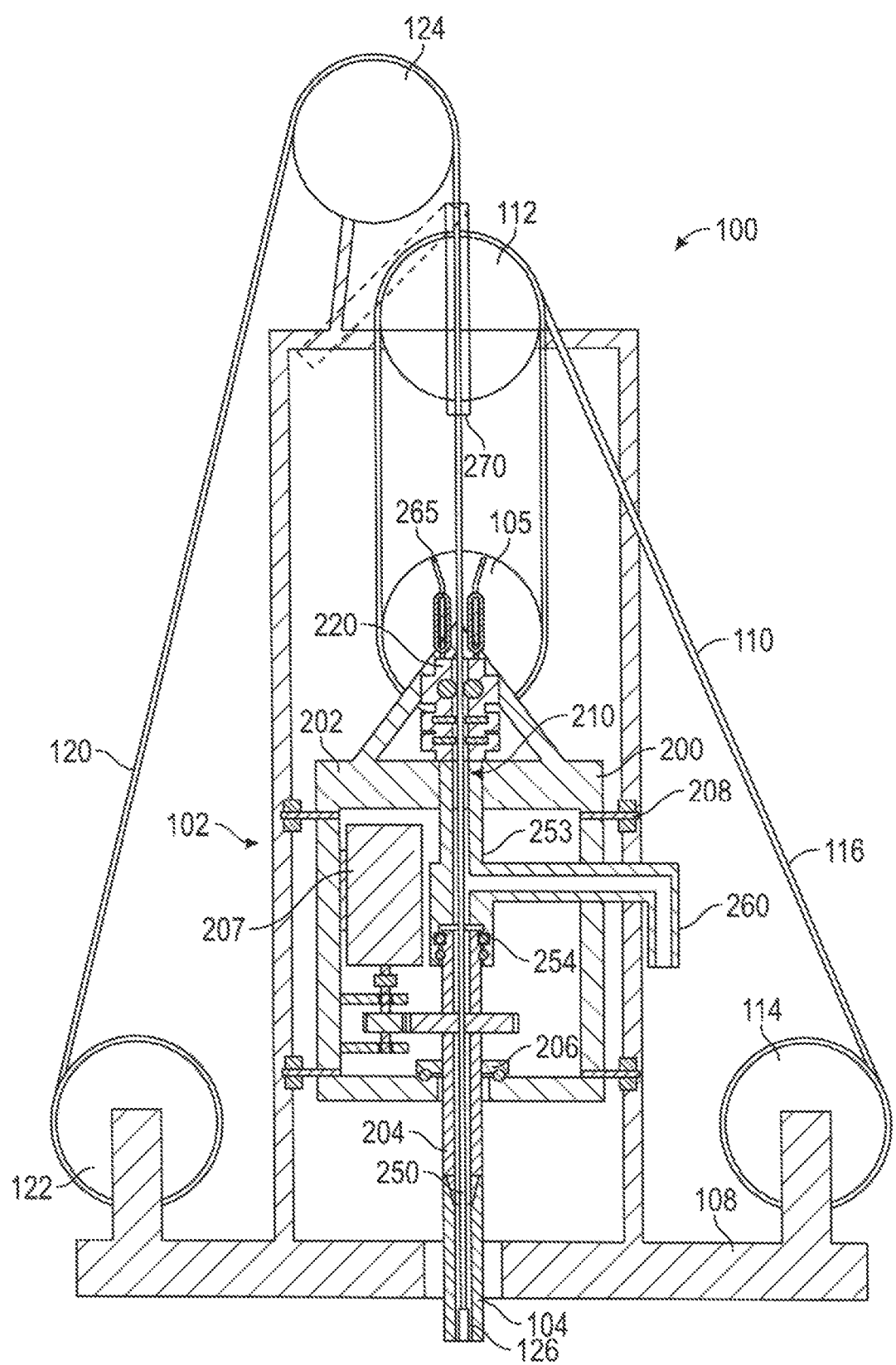
FIG. 2 illustrates a side, schematic view of a tool deployment assembly, according to an embodiment.

FIG. 2 illustrates an enlarged, partial, schematic view of the drilling rig 100, according to an embodiment. As shown, the drilling apparatus 102 may be suspended from the rig floor 108 via interaction with the travelling block 105, the crown block 112, and the drilling line 116 that is spooled on the drawworks 114.

In addition, the drilling apparatus 102 may include a drilling device 200, e.g., a top drive. The drilling device 200 may include a housing 202 and a shaft 204, which may be coupled to and extend out of the housing 202. In particular, the shaft 204 may be rotatably coupled to the housing 202 via a thrust bearing 206. The shaft 204 may be drive to rotate by a motor 207, which may be coupled to and/or disposed within the housing 202. Further, the shaft 204 may be connected to the drill string 104, such that rotation of the shaft 204 may cause the drill string 104 to rotate. Such rotation may be employed for drilling the well in rotary mode, as well as controlling orientation of the drill string 104 while drilling the well in sliding mode with a down-hole motor or turbine, allowing potential deviation of the wellbore 106 to the correct azimuth. By such connection between the shaft 204 and the drill string 104, at least a portion of the weight of the drill string 104 may be supported by the housing 202, which transmits the weight to the rig floor 108 via the crown block 112 and the support structure 110, as well as the drawworks 114. The drilling device 200 may also include one or more rollers 208 (four are shown) or sliding guides, which may transmit reactionary torque loads to the support structure 110. The housing 202 may further include an entry port 210, through which the instrument line 120 and the instrument 126 may be received.

Further, the drilling apparatus 102 may include a sealing device 220, through which the instrument line 120 and the instrument 126 may be received into the entry port 210. The sealing device 220 may be coupled to the housing 202 of the drilling device 200, and may be movable therewith. The sealing device 220 may have (e.g., be able to be operated in) at least three configurations. In an open configuration, the sealing device 220 may be configured to receive the instrument 126 therethrough. In a first, sealed configuration (illustrated in FIG. 2), the sealing device 220 may be configured to receive and seal with the instrument line 120. The instrument line 120 may be able to slide relative to the sealing device 220 when the sealing device 220 is in the first configuration, but fluid may be prevented from proceeding through the entry port 210 by the sealing device 220. In a second, sealed configuration, the sealing device 220 may completely seal the entry port 210, e.g., when the instrument line 120 is not received therethrough. Thus, the sealing device 220 may function similarly to a blowout preventer does for the drill string 104, serving to control access into the entry port 210. The different configurations may be reached based on a position of an annular "preventer" or seal of the sealing device 220, as will be described in greater detail below.

The entry port 210 may communicate with an interior 250 of the shaft 204, e.g., via a conduit 253 within the housing 202. The shaft 204 may be rotatably coupled to the conduit 253 via swivel 254, as shown. Accordingly, the instrument line 120, when received through the entry port 210, may proceed through the conduit 253 and into the shaft 204, and then into the drill string 104.

The drilling device 200 may also receive a flow of drilling mud via a mud conduit 260. The mud conduit 260 may communicate with the conduit 253 within the housing 202, and thus the mud conduit 260 may be in fluid communication with the entry port 210, as well as the interior 250 of the shaft 204 and the drill string 104. The sealing device 220 may serve to prevent mud flow up through the entry port 210 in either or both of the first and second configurations thereof.

The drilling apparatus 200 may further include a line-pusher 265. The line-pusher 265 may be configured to apply a downwardly-directed force on the instrument line 120, which may cause the instrument line 120 to be directed downward, through the sealing device 220, the entry port 210, the conduit 253, the interior 250 of the shaft 204, and through at least a portion of the drill string 104, so as to deploy the instrument 126 (FIG. 1) therein. Further, the line-pusher 265 may be coupled to the housing 202 of the drilling device 200 and may be movable therewith. In an embodiment, the line-pusher 265 may be directly attached to the sealing device 220, e.g., such that the sealing device 220 is positioned between the housing 202 and the line-pusher 265. As such, the line-pusher 265 may be configured to push the instrument line 120 through the entry port 210 via the sealing device 220.

The line-pusher 265 may be employed to overcome initial fluid resistance provided by the drilling mud coursing through the mud conduit 260. Further, the line-pusher 265 may provide for rapid deployment of the instrument line 120 through the drill string 104, e.g., at a similar rate, or even faster than, the velocity of the drilling mud therein, and thus the line-pusher 265 may overcome drag forces of the instrument 126 and the drilling line 116 in contact with the mud and with the bore of the drill string 104.

The line-pusher 265 may also be used to retract the instrument line 120 and the instrument 126 out of the drill string 104, e.g., by reversing direction and pushing the instrument line 120 upwards, away from the entry port 210. The retracted instrument line 120 may thus be spooled on the instrument line spool 122, e.g., with minimum pull force by the instrument line spool 122.

The drilling apparatus 102 may also include a pivotable guide 270, through which the instrument line 120 may be received. The pivotable guide 270 may be positioned, as proceeding along the line 120, between the line sheave 124 and the line-pusher 265. The pivotable guide 270 may be movable across a range of positions, for example, between a first position, shown with solid lines, and a second position, shown with dashed lines. In the first position, the pivotable guide 270 may direct the instrument line 120 between the sheaves of the crown block 112 and between the sheaves of the travelling block 105 and toward the entry port 210. In the second position, the pivotable guide 270 may direct the instrument line 120 away from the entry port 210. For example, the second position may be employed when raising the drilling device 200 so as to accept a new stand of tubulars on the drill string 104 and/or when initially running the instrument 126 and the instrument line 120 into the entry port 210, as will be described in greater detail below.

Figure 3B:
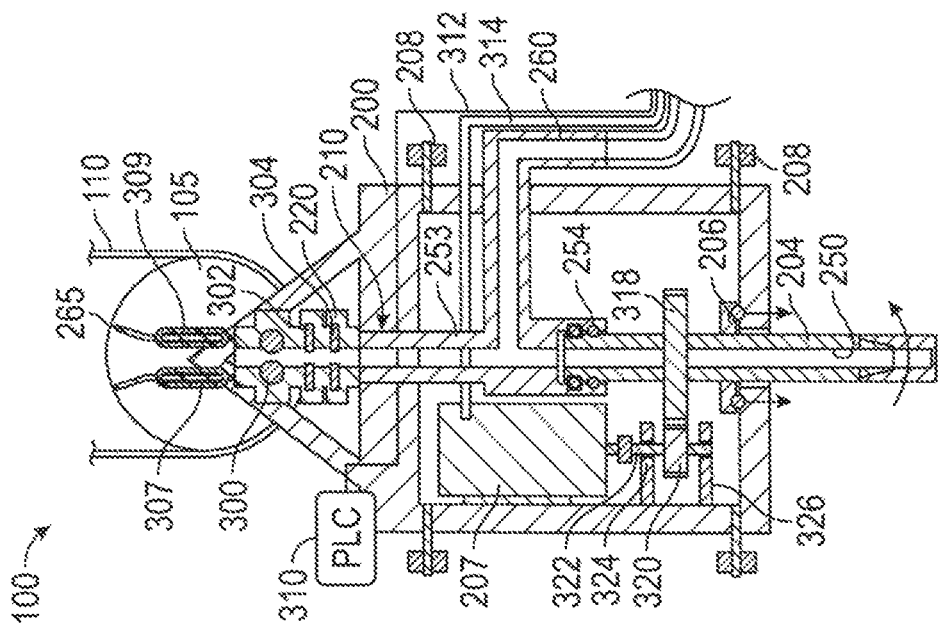
FIG. 3B illustrates a second side view of the top drive of the drilling rig system, according to an embodiment.
Figure 3A:
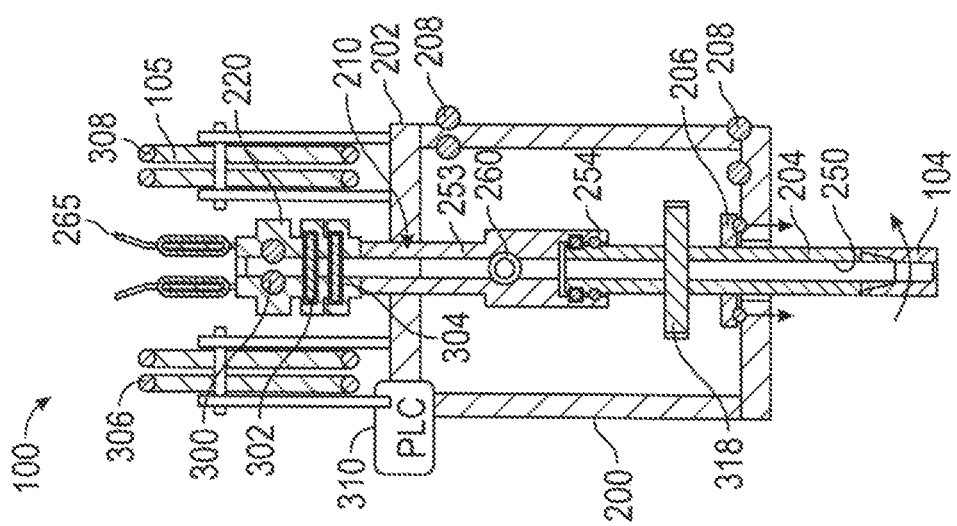
FIG. 3A illustrates a first side view of a top drive of the drilling rig system, according to an embodiment.

FIGS. 3A and 3B illustrates two partial side views of the drilling apparatus 102, specifically showing additional details of the sealing device 220 and the line-pusher 265, among other things, according to an embodiment. As illustrated, the sealing device 220 and the line-pusher 265 may be positioned between two sets of sheaves 306, 308 of the travelling block 105, and thus may be positioned to receive the instrument line 120 and feed the instrument line 120 to the entry port 210.

Further, the sealing device 220 may include an annular seal (e.g., an annular "preventer") 300 and one or more rams (two shown: 302, 304). The annular seal 300 may be movable in response to a command, e.g., radially inwards and outwards. Accordingly, the annular seal 300 may be moved outwards to receive the instrument line 120 and inwards to seal the entry port 210.

The ram 302 may be a pipe ram or a shear ram, and the ram 304 may be a blind ram. In an embodiment, the ram 304 being a blind ram may allow the sealing device 220 to close the entry port 210 when the instrumented line 120 is not present in the sealing device 220. Such situation may occur during drilling operations when usage of the instrument line 120 and/or the instrument 126 is not desired. The change of sealing configuration may occur in response to a remote control with a minimum time delay. Such configuration control may be implemented using a hydraulics system, which apply oil pressure on actuators via manually or computer-controlled valves. In the embodiment in which the ram 302 is a pipe ram, the pipe ram 302 may be used to seal accurately against the instrumented line 120, for example, in situations in which the inside of the drill string 104 is at high pressure. The pipe rams also may support the instrument 120 line within the drill string 104, and thus may serve as a back-up if the line-pusher 265 is temporarily incapable of supporting the instrumented line within the drill sting 104. The ram 302 acting as a shear ram or the ram 304 acting as a shear/blind rams may sever the instrument line 120 when pressure inside the drill string 104 reaches a high value.

Furthermore, an in-line blowout preventer (IBOP) may be installed along the shaft 204. The IBOP may ensure high pressure containment when high formation pressure may be applied inside the top of the drill string 104. Such IBOP ensures isolation of the bore of the drill string 104 from the rotary seal inside the swivel 254 as well as the flexible hose which delivers the fluid to the conduit 260. With the insertion of the instrument line through the IBOP, the IBOP may not be able to close. Thus, the system 100 may include a push-bar, which can be inserted in the entry port to push downwards the sheared instrument line 120.

When the IBOP closes, the instrument line 120 is sheared by the ram 304. Then the bottom of the upper part of the cut instrument line is pulled upward, letting the blind ram 304 close the bore the entry port 210. The cut upper part of the instrument line may then be removed from the entry port 210 and the line pusher 265. In some embodiments, the ram 302 may be a blind ram, providing pressure containment after closing, as soon as the bottom of the upper part of the cut instrument line 120 is lifted above the ram 302. A push-bar may then be delivered by the pilotable guide in the line pusher 265. The line pusher grabs the push-bar, the annular seal 300 is open to let the push-bar enter in the entry port 210, while a blind ram 304 or 302 is closed. The annular seal of the IBOP may be actuated against the push bar. The blind ram 304 (or optionally 302) is open to allow the passage of the lower part the push-bar. Then the push-bar is pushed downwards by the line pusher 265 to push the lower part of the cut instrument line below the IBOP of the shaft 204. Then the push bar is pulled upwards outside the IBOP which may be closed to contain pressure in the drill-string 104 below the IBOP.

In some embodiments, the cut lower part of the instrument line 120 may not bounce upwards after being pushed below the IBOP, as its weight keeps it down. This allows safe closing of the IBOP. In some applications, one or more techniques may be employed to prevent the cut lower part of the instrumented line 120 from bouncing back in the IBOP. For example, a flow valve may be installed below the IBOP at the bottom of the shaft 204. After the push-bar has pushed the instrument line below the IBOP, above the flow valve, this flow valve may be closed to pinch and hold the cut instrument line 120, thereby prohibiting bounce upwards of this line. In another embodiment, the push-bar may have a device at its bottom which would stay in the bore of the flow line (either the shaft 204 or the bottom bore of the IBOP) due to friction system with the bore or by a latching system which may engage a dog into a groove of the bore of the flow line below IBOP. When the IBOP has been closed, the push-bar may be pulled upwards by the line pusher 265. When the push-bar has been raised above the blind ram 304, the blind ram 304 may be closed. Then the push-bar may be removed out of the entry port 220.

The actuation of the annular seal 300, the rams 302, 304, as well as the control of the pivotable guide 270 and the delivery/recovery of the push-bar may be performed by various actuators which can be remote controlled. The PLC 310 of FIG. 3B may perform such control.

Further, the line-pusher 265 may include two or more tracks or "caterpillars" 307, 309, which may engage and move the instrument line 120 into and/or out of the entry port 210. The tracks 307, 309 may include links, rollers, or any other structure capable of engaging the instrument line 120 and, e.g., through the friction created by such an engagement, force the instrument line 120 downwards into the entry port 210, or to pull the instrument line 120 upwards, out of the entry port 210, as the tracks 307, 309 are moved. The tracks 307, 309 may have shapes to match the circular pattern of the instrument line 120, allowing distributed contact between the tracks 307, 309 with the instrument line 120 for high friction while keeping the local contact pressure to an acceptable level for the instrument line 120. The high friction allows to the "caterpillars" to apply fair push or pull force onto the instrument line 120.

In the illustrated embodiment, the shaft 204 is connected to a gear 318, which meshes with a gear 320 that is connected to a motor shaft 322. The motor shaft 322 is rotated by the motor 207, and such rotate is transmitted to the shaft 204 via the meshing gears 318, 320. In this embodiment, the motor 207 is coupled to the housing 202, while mounts 324, 326 support the shaft of pinion gear 320.

The drilling apparatus 102 may also include a controller 310, which may be coupled to the housing 202 and movable therewith, or otherwise in communication with the drilling device 200. The controller 310 may receive commands, e.g., from the controller 128 (FIG. 1) via a control line 312, but in some embodiments, may be autonomous. Further, the controller 310 may control the operation of the line-pusher 265, e.g., to control when the line-pusher 265 operates to feed the instrument line 120 through the entry port 210. The controller 310 may also operate to control the sealing device 220, e.g., to control when the annular seal 300 moves radially and to control the operation of one or both rams 302, 304. The controller 310 may further control or monitor the power to the motor 207 via a power line 314, so as to control when, and at what speed, the motor 207 rotates the shaft 204.

In embodiments, the instrument line 120 may be or include a metallic tube such as a hydraulic line with one or more internal wires therein (e.g., electrical or fiber optic wires) for communication and/or transmission of power. The instrument line 120 may have a diameter from approximately 1/16 inch to approximately 1 inch or from approximately 1/8 inch to approximately 1/2 inch. The instrument line 120 may transmit signals to and from one or more instruments 126 or other devices coupled thereto. The instrument line 120 may transmits power to and from one or more instruments 126 or other devices coupled thereto.

The instrument line 120 may have an adequate torsional resistance to resist friction torque (e.g., due to rotation of the drill string): the circular metallic section may provide such resistance. The instrument line 120 may also have a smooth outer surface or approximately smooth outer surface, which may lead to lower friction than a conventional cable. The instrument line 120 may be compatible with an injection head and with the caterpillar, described above.

The instrument line 120 may be configured to transmit measurement data as a single cable application or a continuous cable application. For example, the instrument line 120 may transmit logging data to the rig. One or more downhole instruments 126, delivered by the instrument line 120, may be any type of instrument, such as a wireline logging tool or a logging-while-drilling ("LWD") tool, a measurement-while-drilling ("MWD") tool, a geophone, an acoustic receiver, a torque sensor, and/or the like. The downhole instrument 126 may be configured to obtain measurements in the wellbore 106, and the measurements may be or include current measurements, voltage differential measurements, rotational measurements (e.g., local instantaneous RPM of the drill string 104), radial shocks, local elastic deformation measurements (e.g., axial and torsion), steel acoustic transmission measurements (e.g., "CBL-type"), and the like. In addition, the downhole instrument 126 may include a clamping system that serves as a "REW free-point indicator." In another example, the instrument line 120 may be used to recover mud pulse telemetry data from a measuring-while-drilling tool.

FIGS. 4A and 4B illustrate conceptual, side, schematic views of a well site including the drilling rig 100, in which various downhole instruments may be used, according to embodiments. For example, FIG. 4A illustrates a conceptual, side, schematic view of the well site 400, in which a logging tool 402 may be used, according to an embodiment. As illustrated, the drill string 104 with the instrument line 120 therein may be run into the wellbore 106. The wellbore 106 may include a vertical portion, a deviated portion, and a horizontal portion. The logging tool 402 may be coupled to the instrument line 120 and positioned within the drill string 104, for example, at a deviated portion.

A bottom-hole assembly ("BHA") 404 may be coupled to a lower end of the drill string 104. The BHA 404 may be or include several downhole tools above a drill bit 406. The downhole tools may be or include a rotary steerable system, a motor, and one or more MWD/LWD tools 408. The drilling rig may also include a fluid reservoir 410 (e.g. mud) and a pump 412 for cycling the fluid through the drill string 104 via a fluid line 416. While not illustrated, the drill string 104 may include one or more tools or substitutes ("subs"), such as MWD and LWD, shock and vibration reduction tools, agitator tools, drilling motor, rotary steerable system ("RSS"), etc. The one or more tools or subs may be coupled to the drilling string at any location (e.g., in the BHA 404) to assist in the drilling process. In some embodiments, the drill string 104 may include a universal bore hole orientation ("UBHO") sub. The UBHO sub may axially and rotational fix one or more downhole electronics packages within the drill string 104. For example, the UBHO sub may include one or more steering tools, one or more gyroscopes, one or more MWD or LWD tools, e.g., MWD/LWD tools 408, etc.

The logging tool 402 may be configured to measure one or more formation properties and/or physical properties, as the wellbore 106 is being drilled or at any time thereafter. For example, the logging tool 402 may take measurements such as D&I measurements in the deviated portion of the wellbore (i.e., the dogleg), gyroscope, gamma ray measurements, RPM measurements (e.g., local instantaneous drill string RPM measurements) and the like. Likewise, for example, the formation properties may include resistivity, density, porosity, sonic velocity, gamma rays, and the like. Additionally, for example, the physical properties may include pressure, temperature, wellbore caliper, wellbore trajectory, a weight-on-bit, torque-on-bit, vibration, shock, stick slip, and the like. In at least one embodiment, the logging tool 402 may include a swivel 418, as discussed in more detail below.

The logging tool 402 may transmit data (e.g., formation properties, physical properties, etc.) from within the wellbore 106 up to a computer system 420. The instrument line 120 may be made of a metallic tube (such as a hydraulic line) with one or more internal wires 422 therein (e.g., electrical or fiber optic wires) for communication. For example, the logging tool 402 may be coupled to the computer system 420 by one or more internal wires 422. Additionally, power may be supplied to the logging tool 402 via the one or more internal wires 422.

In another example, FIG. 4B illustrates a conceptual, side, schematic view of the well site 450, in which a for MWD telemetry reception tool 452 may be used, according to an embodiment. In some embodiments, the MWD 458 may be installed in the BHA 454. As illustrated, the drill string 104 with the instrument line 120 therein may be run into the wellbore 106. The wellbore 106 may include a vertical portion, a deviated portion, and a horizontal portion. The MWD telemetry reception tool 452 may be coupled to the instrument line 120 and positioned within the drill string 104. For example, the MWD telemetry reception tool 452 may be positioned in the vertical portion of the wellbore. In some embodiments, the MWD telemetry reception tool 452 may be positioned below the vertical portion of the wellbore. The MWD telemetry reception tool 452 may be coupled to the instrument line 120 by a swivel (not show), as described below.

A BHA 454 may be coupled to a lower end of the drill string 104. The BHA 454 may be or include several downhole tools above a drill bit 456. The downhole tools may be or include a rotary steerable system, a motor, and one or more MWD/LWD tools 458. The drilling rig may also include a fluid reservoir 460 (e.g. mud) and a pump 462 for circulating the fluid through the drill string 104 via a fluid line 464. While not illustrated, the drill string 104 may include one or more tools or subs, such as MWD and LWD, shock and vibration reduction tools, agitator tools, drilling motor, RSS, etc. The one or more tools or subs may be coupled to the drilling string at any location (e.g., in the BHA 454) to assist in the drilling process. In some embodiments, the drill string 104 may include a UBHO sub. The UBHO sub may axially and rotational fix one or more downhole electronics packages within the drill string 104. For example, the UBHO sub may include one or more steering tools, one or more gyroscopes, one or more MWD or LWD tools, e.g., MWD/LWD tools 458, etc.

The MWD/LWD tools 458 may be configured to measure one or more physical properties as the wellbore 106 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements and data from the MWD/LWD tools 458 may be transmitted upwards to the MWD telemetry reception tool 452 for relay to the surface, for example, the computer 466 via the one or more wires 468. For example, the MWD/LWD tools 458 may send a telemetry signal 470 (e.g. mud pulse telemetry signal) to the MWD telemetry tool 452 for relay to the surface. Additionally, power may be supplied to the MWD telemetry reception tool 452 via the one or more internal wires 468.

The MWD telemetry reception tool 452 may group the sets of data from the MWD/LWD tools 458 and the MWD telemetry reception tool 452 and prepare the data for transmission to the surface after proper encoding. The MWD telemetry reception tool 452 may improve signal reception and/or increase the data rate from the MWD tools 458. Such process may occur while drilling or during any operation associated with drilling program. Periodically, drill-pipe may have to be added or removed of the drill-string 104. Before such addition/removal of pipe, the instrument line 120 and the MWD telemetry reception tool 452 must be removed. During the period of absence of instrument 452 and instrument line 120 at the proper location in the drill-string 104, there is a blind period: no data may be received via this communication system involving the MWD telemetry reception tool 452, if the drilling continues for no NPT (None-Productive time). This blind period may be about 0.5% of the drill time, or a NPT of 0.5% may be imposed. The drilling rig 100 may also include one or more devices 472 and communication lines 474 to collect data from the MWD/LWD tools 458 in the wellbore 106, involving mud-pulse telemetry. In some other embodiment, surface reception sensor may be provided near/at the rig to receive MWD e-mag telemetry.

Figure 5:
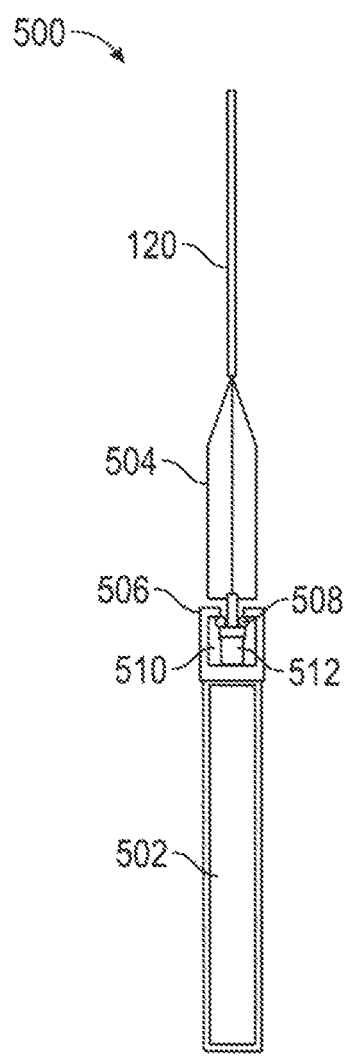
FIG. 5 illustrates a conceptual, side, schematic view of the instrument coupled to the instrument line, according to an embodiment.

FIG. 5 illustrates a conceptual, side, schematic view of the instrument 500 coupled to the instrument line 120, according to an embodiment. The instrument 500 may include an electronics section 502, a tool head 504, and a swivel 506.

The electronics section 502 may include any electronics or electrical components that may be used during the operations. The electronics section 502 may be sealed at a pressure that assists in the operations of the electronics or electrical components, for example, approximately atmospheric pressure. For example, the electronics section 502 may include measurement system equivalent to LWD tools (e.g., logging tool 402), and/or MWD telemetry tools (e.g. MWD telemetry reception tool 452), control modules, communication devices, and the like. For example, the electronics section 502 may also include a network node. The network node may be used to decode and re-encode in one or two directions, for example, data transmitted downhole from the surface and/or data received from instruments in the wellbore 106 and transmitted to the surface. Data collected within the electronics section may also be added to the data transmitted by the network node. For example, data from an accelerometer or a magnetometer (e.g., for rotation) may be added to the data that is decoded or re-encoded. In another example, data relating to pipe stretch and twist may be added to the data that is decoded or re-encoded. The data transmission may be from the surface (e.g., the computer 128 to the instrument (e.g., logging tool 402), and/or MWD telemetry tools (e.g. MWD telemetry reception tool 452) so that the instrument may perform requested tasks and operate under proper setting and controls. The electronics section 502 may also include a power source. The power source may be any type of power source such as a battery, a rechargeable battery, and the like. For example, the power may be supplied through the instrument line to drive the power source and provide power to the electronics section 502 and other components in the wellbore 106, for example, the BHA. The power source may provide power if the instrument 500 is disconnected from the surface power system.

The swivel 506 may be positioned between the instrument line 120 and the electronics section 502. The swivel 506 may allow the electronics section 502 to rotate while the instrument line 120 does not rotate. This may allow the electronics section 502 to rotate with the drill string 104.

The swivel 506 may also support the axial load generated by the instrument 500. For example, the swivel 506 may include thrust bearing 508. The swivel 506 may also include lubrication 510 (e.g. oil) within a cavity of the swivel 506 and surround the thrust bearing 508. The swivel 506 may also include rotary connection 512 for signal transmission. The rotary connection 512 may allow for signal and/or power transmission for each wire in the instrument line and for grounding the tubing, while the swivel is submitted to relative rotation form its top and bottom. For example, the rotary connection 512 may be rotary contact or a rotary split transformer.

Figure 6:
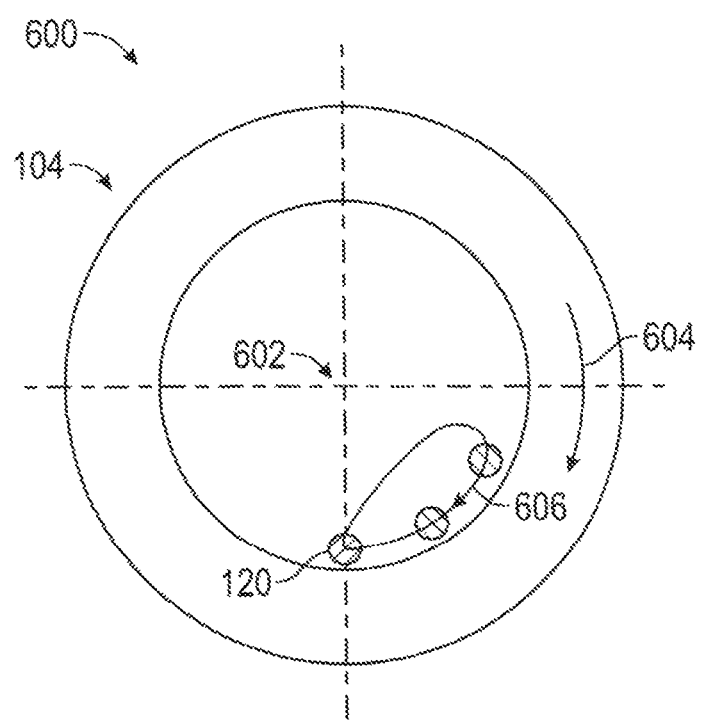
FIG. 6 illustrates a cross-sectional view of the instrument line in the bore of the drill string, according to an embodiment

FIG. 6 illustrates a cross-sectional view 600 of the instrument line 120 in the bore of the drill string 104, according to an embodiment. The drill string 104 may rotate about a central longitudinal axis 602. As shown, the drill string 104 rotates clockwise direction 604; however, in other embodiments, the drill string 104 may rotate counterclockwise direction. The instrument line 120 may move (e.g., whirl) within the bore of the drill string 104 as the drill string 104 rotates, as shown by the arrows 606. The instrument line 120 may be pulled to the low side by gravitational forces.

In the examples described above, the hydraulic drag on the instrument line 120 may be up to twice the weight of the instrument line 120. The Euler buckling length may be about 100 ft at the top of the instrument line 120 and about 10 ft at the bottom of the instrument line. When sufficiently rigid with its external metal tube, the instrument line 120 may not pack within the bore of the drill string if/when it fails unlike conventional cables.

In the examples described above, the instrument line 120 may be able to transmit data to and from the rig from approximately 5 kbits/second to approximately 100 kbits/second or more without a repeater. The instrument line 120 may be connected to one or more modems. The instrument line 120 may use two frequency bandwidths: one for downlinking and one for uplinking. The instrument line 120 may be used for point-to-point communication (e.g., as a REW application) or a network system with a plurality of distributed nodes. In at least one embodiment, the instrument line 120 may transmit power (e.g., up to about 100 watts).

Figure 7:
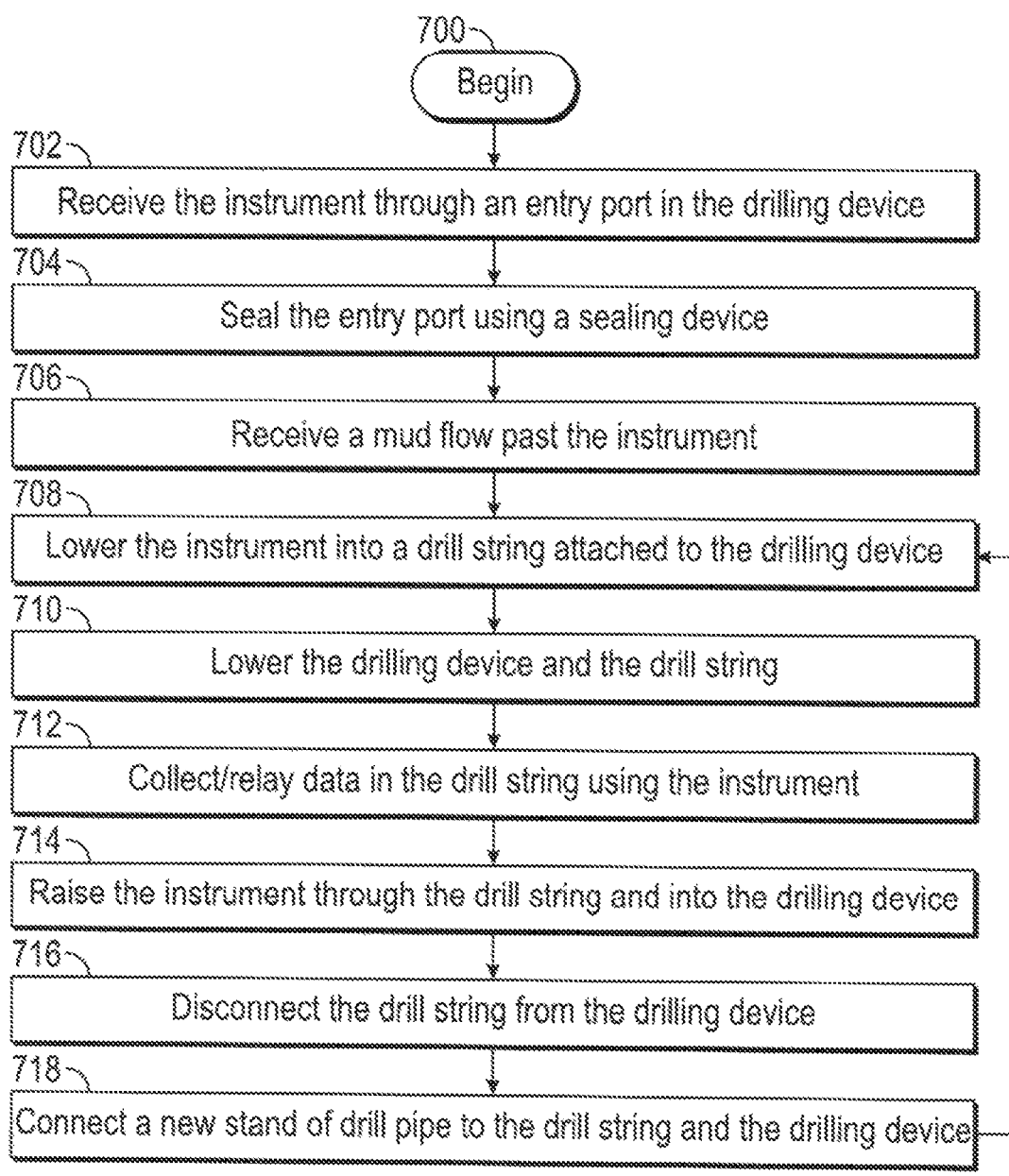
FIG. 7 illustrates a flowchart of a method for deploying a tool within a drill string, according to an embodiment.

FIG. 7 illustrates a flowchart of a method 700 for deploying the instrument 126 into the drill string 104 deployed into the wellbore 106, according to an embodiment. For example, the method may be utilized to deploy include LWD tools (e.g., logging tool 402), MWD telemetry tools (e.g. MWD telemetry reception tool 452), described above. Although the present method 700 is described with reference to the drilling rig 100 discussed above, it will be appreciated that this is merely an example, and embodiments of the method 700 may be applied using other structures.

The method 700 may begin with receiving an instrument (e.g., logging tool 402 and/or MWD telemetry reception tool 452) in the drilling device 200, as at 702. This may include, for example, receiving the instrument (e.g., logging tool 402 and/or MWD telemetry reception tool 452) and the instrument line 120 down between the sheaves of the crown block 112, between the sheaves of the travelling block 105, through the line-pusher 265, through the sealing device 220, and into the entry port 210 of the housing 202. In a specific embodiment, the instrument (e.g., logging tool 402 and/or MWD telemetry reception tool 452) may be positioned in the interior 250 of the shaft 204, or in the conduit 253.

The method 700 may also include sealing the entry port 210 using the sealing device 220, as at 704. For example, the annular seal 300 of the sealing device 220 may extend radially inward from an open position, which allows the instrument (e.g., logging tool 402 and/or MWD telemetry reception tool 452) to pass through, to a first, sealed configuration, in which the annular seal 300 engages and seals with the instrument line 120.

The method 700 may include receiving a flow of mud past the instrument (e.g., logging tool 402 and/or MWD telemetry reception tool 452), as at 706. The method 700 may then proceed to lowering the instrument (e.g., logging tool 402 and/or MWD telemetry reception tool 452) into the drill string 104, as at 708. At least a part of this lowering may be accomplished by pushing the instrument line 120 using the line-pusher 265, although at least a part of this pushing may also or instead rely on drag effect generated by the flowing mud or even only gravity effect. Further, the instrument (e.g., logging tool 402 and/or MWD telemetry reception tool 452) may be lowered (e.g., pushed) to a predetermined depth within the drill string 104. In addition, while the instrument (e.g., logging tool 402 and/or MWD telemetry reception tool 452) is being lowered, the instrument line spool 122 may unspool the instrument line (e.g., logging tool 402 and/or MWD telemetry reception tool 452) therefrom, so as to allow the line 116 to be extended down into the drill string 104. The unspooling of the instrument line 120 may be coordinated, e.g., synchronized, with the pushing by the line-pusher 265. Such lowering may occur rapidly, e.g., to minimize "blind" time during deployment during which the instrument (e.g., logging tool 402 and/or MWD telemetry reception tool 452) is not in position to transmit data. For example, such lowering may occur at about 5, about 10, about 15, or about 20 meters per second.

In an embodiment, the method 700 may include lowering the drilling device 200, e.g., by unspooling drilling line 116 from the drawworks 114, as at 710. In some embodiments, lowering the drilling device 200 may occur at the same time as the instrument (e.g., logging tool 402 and/or MWD telemetry reception tool 452) is being pushed into the drill string 104, and thus the pushing of the drill string 104 may take into account the change in position of the drilling device 200.

Prior to, during, or after lowering the drilling device 200, the instrument (e.g., logging tool 402 and/or MWD telemetry reception tool 452) may be moved into one or more predetermined positions and employed to collect data (e.g., formation, seismic, drill-pipe stress, torque, stick-slip, seismic, gyroscopic, nuclear magnetic resonance, or any other type of data), as at 712, which may be sent to the one or more surface controllers 128, e.g., via the instrument line 120. Further, data may be collected by the instrument (e.g., logging tool 402 and/or MWD telemetry reception tool 452) as transmitted from the surface via the instrument line 120, e.g., for purposes of configuration of sensors of the instrument (e.g., logging tool 402 and/or MWD telemetry reception tool 452) or for relay to other equipment of the drill string 104, such as the steering components of the bottom-hole assembly (not shown). The instrument (e.g., logging tool 402 and/or MWD telemetry reception tool 452) and the instrument line 120 may be present in the bore the drill-string 104 during drilling operation involving movement of the drill-string, including rotation and axial movement of the drill-string 104. The instrument line may be twisted due friction generated by the rotation of the drill-string 104 onto the instrument line 120 and even on the instrument (e.g., logging tool 402 and/or MWD telemetry reception tool 452).

The method 700 may also include raising the instrument (e.g., logging tool 402 and/or MWD telemetry reception tool 452) to a position within the drilling device 200, e.g., within the shaft 204 or within the conduit 253, as at 714. This may occur rapidly, for example, at least about 5, about 10, or about 15 meters per second, or more. For example, this may be conducted in response to the drilling device 200 reaching a predetermined elevation with respect to the rig floor 108, e.g., when the drilling device 200 is at or near to its lower end range of movement. The axial movement of the instrument (e.g., logging tool 402 and/or MWD telemetry reception tool 452) may occur when other axial movement may be imposed on the drill-string 104. In some embodiments, the axial movement of the system may be synchronized so that the instrument (e.g., logging tool 402 and/or MWD telemetry reception tool 452) stays at a relative constant position within the drill-string 104, by synchronizing the movement of the drawwork 114 and the line spool 122. In other applications, the instrument may be kept at the same position versus the earth, while the drill-string 104 is moving axially in the well-bore.

Once the instrument (e.g., logging tool 402 and/or MWD telemetry reception tool 452) is above the drill string 104, the shaft 204 may be disconnected from the drill string 104, as at 716. Thereafter, a new stand of one or more tubulars may be added to the drill string 104 and attached to the new stand, as at 718. The method 700 may return to lowering the instrument 126 at 708, and the sequence may repeat.

In one example of the method 700, fluid (e.g., mud) may be pumped through the bore of the drill string at about 20 ft/sec. The instrument line 120 may be run into the drill string at about 40 ft/second depending on buckling and the effects of gravity. The instrument line 120 may be pulled out of the drill string at about 30 ft/second depending on erosion. In one example, the instrument line 120 may be a metallic tube having a diameter of ¼ inch, and the instrument line 120 may be 4000 ft long. The weight of the instrument line 120 may be about 450 lbs, and the friction factor may be 30%. At an inclination angle of 10 degrees, the torsion stress may be about 1100 PSI, and there may be about 3 twisting turns (e.g., at the bottom). At an inclination angle of 90 degrees, the torsion stress may be about 6300 PSI, and there may be about 17 twisting turns (e.g., at the bottom).

The instrument line 120, which is 4000 ft in this example, may be run into the drill string in 90 seconds. During this 90 seconds, the following activities may occur on the drilling rig: 15 seconds for torque on connection, 15 seconds to go out of the slips, 15 seconds to go on-bottom, 30 seconds for surveying, and 15 seconds of additional time for the instrument line 120 to reach the installation depth. The instrument line 120 may be pulled out of the drill string in 2 minutes. During this 2 minutes, the following activities may occur on the drilling rig: 30 seconds for circulation off-bottom, 15 seconds to go in-slip, 15 seconds to un-torque the drill string, 45 seconds for lifting the hook at the top of the mast, and 15 seconds of extra time for retrieval of the instrument line 120. The total loss time for operation of the instrument line 120 may be about 30 seconds per connection. The user may be blind (no information from down-hole as the instrument (e.g., logging tool 402 and/or MWD telemetry reception tool 452) is not at the correct position within the drill-string 104) for about 45 seconds after drilling is restarted and for about 15 seconds before the end of the drilling period. With a rate of penetration of about 90 ft/hour, one "triple" may be added every hour. In another example, it may take about 30 seconds per triple or per 60 minutes of drilling. The average readiness may be 99.3% of the total drilling time.

The instrument line 120 may resist friction torque. For example, if the wellbore includes a horizontal portion that is about 8000 ft long, the shear stress on the instrument line 120 may be about 12000 PSI, and there may be up to about 66 turns of twisting. The instrument line 120 may be able to slide fast within the wellbore when lubricated. This may reduce friction, wear, and damage to communication line or a rubber seal wrapped thereabout.

Figure 8B:
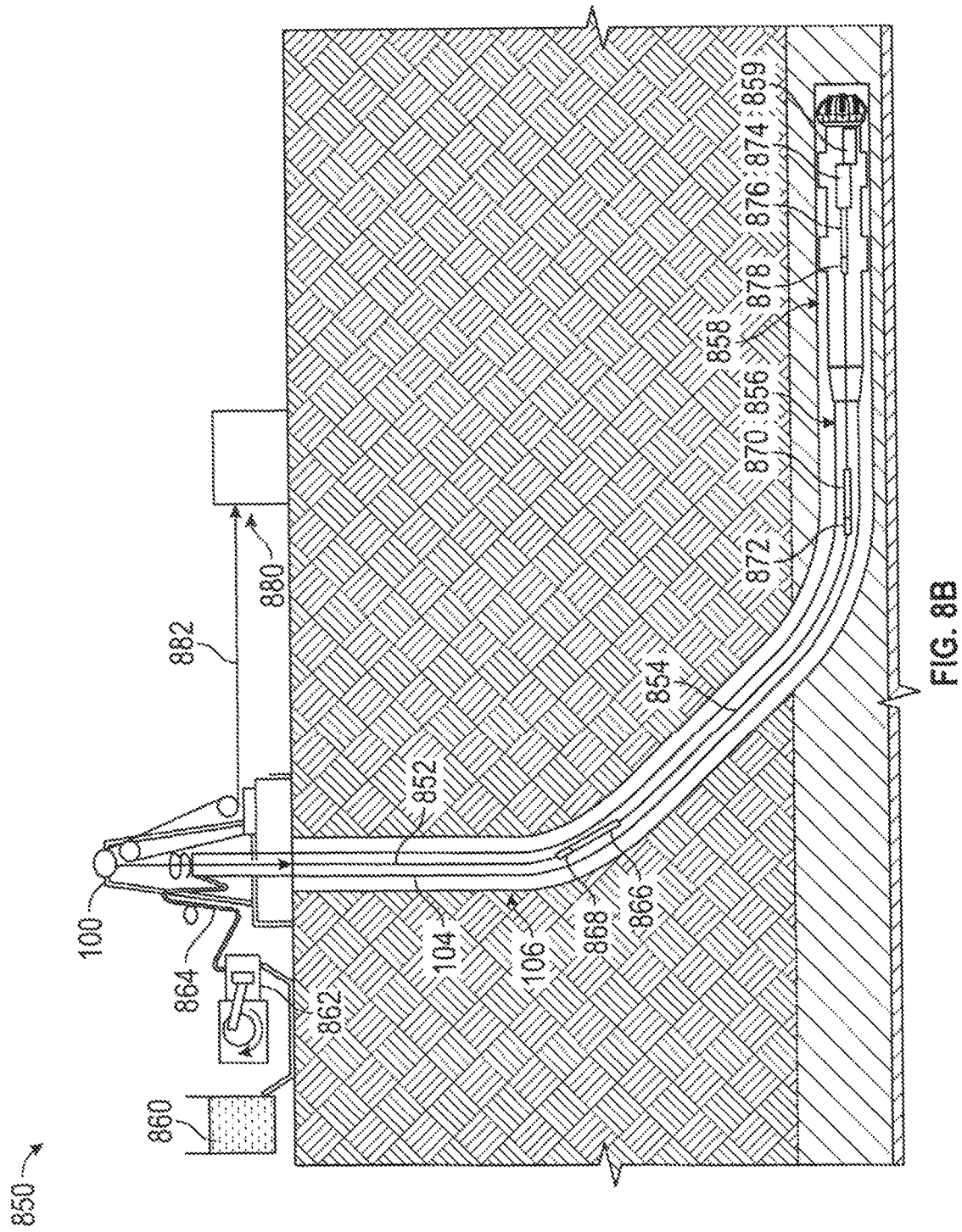

FIGS. 8A and 8B illustrate conceptual, side, schematic views of a well site including the drilling rig 100, in which multiple instrument lines may be used, according to an embodiment. For example, FIG. 8A illustrates a conceptual, side, schematic view of the well site 800, in which two instrument lines may be used, according to an embodiment. As illustrated, the drill string 104 with an instrument line (e.g. instrument line 120) including a first section 802 and a second section 804 therein may be run into the wellbore 106. The wellbore 106 may include a vertical portion, a deviated portion, and a horizontal portion. A BHA 806 may be coupled to a lower end of the drill string 104. The BHA 806 may be or include several downhole tools above a drill bit 808. The downhole tools may be or include a rotary steerable system, a motor, and one or more MWD and LWD tools. The drilling rig may also include a fluid reservoir 810 (e.g. mud) and a pump 812 for cycling the fluid through the drill string 104 via a fluid line 814. While not illustrated, the drill string 104 may include one or more tools or subs, such as MWD and LWD, shock and vibration reduction tools, agitator tools, drilling motor, RSS, etc. The one or more tools or subs may be coupled to the drilling string at any location (e.g., in the BHA 806) to assist in the drilling process. In some embodiments, the drill string 104 may include a UBHO sub. The UBHO sub may axially and rotational fix one or more downhole electronics packages within the drill string 104. For example, the UBHO sub may include one or more steering tools, one or more gyroscopes, one or more MWD or LWD tools, etc.

To couple the first section 802 and the second section 804 of the instrument line, a junction module 816 may be coupled to an upper end of the second section 804 of the instrument line. The junction module 816 may include one or more anchors that are configured to expand radially-outward to contact an outer tubular (e.g., the drill string 104). A fishing module 818 may be coupled to a lower end of the first section 802 of the instrument line. The fishing module 818 may be coupled to the junction module 816. In an embodiment, the fishing module 818 and the junction module 816 may be able to transmit power and/or data to and from one another. The fishing module 818 may include a swivel that allows the fishing module 818 to rotate with respect to the instrument line.

A logging tool 820 may be coupled to a lower portion of the second section 804 of the instrument line and positioned within the drill string 104. The logging tool 820 may be configured to measure one or more formation properties and/or physical properties, as the wellbore 106 is being drilled or at any time thereafter. For example, the logging tool 820 may take measurements such as D&I measurements in the deviated portion of the wellbore (i.e., the dogleg), gamma ray measurements, RPM measurements (e.g., local instantaneous drill string RPM measurements), and the like. Likewise, for example, the formation properties may include resistivity, density, porosity, sonic velocity, gamma rays, and the like. Additionally, for example, the physical properties may include pressure, temperature, wellbore caliper, wellbore trajectory, a weight-on-bit, torque-on-bit, vibration, shock, stick slip, and the like.

The logging tool 820 may transmit data (e.g., formation properties, physical properties, etc.) from within the wellbore 106 up to a computer system 822. The first section 802 and the second section 804 of the instrument line may be or include a metallic line with one or more internal wires 824 therein (e.g., electrical or fiber optic wires) for communication. For example, the logging tool 820 may be coupled to the computer system 822 by one or more wires 824.

In at least one embodiment, there may be a wet, stabbable electrical coupler between the junction module 816 and the fishing module 818. The coupler may be an inductive coupler such as a LWD data latch. Telemetry through the coupler may be conducted at high frequencies (e.g., above 50 kilohertz). Power (e.g., AC power) may be transmitted through the coupler at 50 or 60 hertz.

In embodiments, one or more of the sections of the instrument line may be installed in the wellbore 106 while one or more sections are removed from the wellbore 106. For example, one or more anchors may be set for the junction module 816. The fishing module 818 may be disconnected from the junction module 816 after the anchors are set. The first section 802 of the instrument line may then be tripped out of the wellbore 106, while the second section 804 with the logging tool 820 and junction module 816 remains inside the drill-sting 104 When removing some section of instrument line (e.g., 852), the anchor of the junction module (just below the removed instrument line must be set to hold the junction module (e.g., 866) at the proper location in the drill-string as well as supporting the weight of the instrument line below that junction module.

One or more of the sections of the instrument line may be removed from the wellbore 106. The removed section may be in the range of the bit drilled interval. This may be, for example, 4000 feet deep. Although two sections of the instrument line are shown, it will be appreciated that more sections may be used (e.g., five sections). The instrument may have the same length or different lengths.

To place a section of the instrument line or of the junction module 816 and the fishing module 818 or the logging tool 820 within the drill string 104, a centralizer may be used for the first section 802 of the instrument line, the second section 804 of the instrument line, the junction module 816, or the fishing module 818. The centralizer may be a bow-spring centralizer. The centralizer may generate at least some radial pre-compression. The centralizer may keep the sections of the instrument line or associated devices (e.g., 816,818, 820) positioned in the center of the drill string 104. This may allow for no (or minimal) contact between the sections of the instrument line or associated devices (e.g. 816,818, 820) and the drill string 104. The centralizer may also prevent the sections of the instrument line from whirling in horizontal portions of the wellbore 106. As such, it may also prevent damage to the sections of the instrument line due to rotary friction. The centralizer may deform to become substantially flat. The centralizer may have a substantially smooth leading edge. In at least one embodiment, the centralizer may be run through the blow-out preventer when being run into the wellbore 106.

In another example, FIG. 8B illustrates another conceptual, side, schematic view of the well site 850, in which multiple instrument lines may be used, according to embodiments. As illustrated, the drill string 104 with an instrument line (e.g. instrument line 120) including a first section 852, a second section 854, and a third section 856 therein may be run into the wellbore 106. The wellbore 106 may include a vertical portion, a deviated portion, and a horizontal portion. A BHA 858 may be coupled to a lower end of the drill string 104. The BHA 858 may be or include several downhole tools above a drill bit. The downhole tools may be or include a rotary steerable system ("RSS") 859, a motor, and one or more MWD tools or LWD tools, described below. The drilling rig may also include a fluid reservoir 860 (e.g. mud) and a pump 862 for cycling the fluid through the drill string 104 via a fluid line 864. While not illustrated, the drill string 104 may include one or more tools or subs, such as MWD and LWD, shock and vibration reduction tools, agitator tools, drilling motor, RSS etc. The one or more tools or subs may be coupled to the drilling string at any location (e.g., in the BHA 858) to assist in the drilling process. In some embodiments, the drill string 104 may include a UBHO sub. The UBHO sub may axially and rotational fix one or more downhole electronics packages within the drill string 104. For example, the UBHO sub may include one or more steering tools, one or more gyroscopes, one or more MWD or LWD tools, etc.

To couple the first section 852 and the second section 854 of the instrument line, a junction module 866 may be coupled to an upper end of the second section 854 of the instrument line. The junction module 866 may include one or more anchors that are configured to expand radially-outward to contact an outer tubular (e.g., the drill string 104). A fishing module 868 may be coupled to a lower end of the first section 852 of the instrument line. The fishing module 868 may be coupled to the junction module 866. In at least one embodiment, the fishing module 868 and the junction module 866 may be able to transmit power and/or data to and from one another. The fishing module 868 may include a swivel that allows the fishing module 868 to rotate with respect to the instrument line.

To couple the second section 854 and the third section 856 of the instrument line, a junction module 870 may be coupled to an upper end of the third section 856 of the instrument line. The junction module 870 may include one or more anchors that are configured to expand radially-outward to contact an outer tubular (e.g., the drill string 104). A fishing module 872 may be coupled to a lower end of the second section 854 of the instrument line. The fishing module 872 may be coupled to the junction module 870. In at least one embodiment, the fishing module 872 and the junction module 870 may be able to transmit power and/or data to and from one another. The fishing module 872 may include a swivel that allows the fishing module 872 to rotate with respect to the instrument line.

The BHA 858 may include one or more MWD/LWD tools 874. The LWD tool 874 may be coupled to a lower portion of the third section 856 of the instrument line by a BHA interconnect 876 and a fishing module 878. The LWD tool 874 may be configured to measure one or more formation properties and/or physical properties, as the wellbore 106 is being drilled or at any time thereafter. For example, the MWD/LWD tool 874 may take measurements such as D&I measurements in the deviated portion of the wellbore gamma ray measurements, RPM measurements (e.g., local instantaneous drill string RPM measurements) axial load in the BHA (called WOB) and down-hole torque applied on the bit, and the like. Likewise, for example, the formation properties may include resistivity, density, porosity, sonic velocity, gamma rays, and the like. Additionally, for example, the physical properties may include pressure, temperature, wellbore caliper, wellbore trajectory, a weight-on-bit, torque-on-bit, vibration, shock, stick slip, and the like.

The LWD/MWD tools 874 may transmit data (e.g., formation properties, physical properties, etc.) from within the wellbore 106 up to a computer system 880. The first section 852, the second section 854, and the third section 856 of the instrument line may be or include a metallic line with one or more internal wires 882 therein (e.g., electrical or fiber optic wires) for communication. For example, the LWD/MWD tool 874 may be coupled to the computer system 880 by the one or more wires 882. The sections of the instrument line may provide one-way or two-way communication between the surface computer 880- and the BHA 858. The communication form the surface system 880 to the down-hole BHA (e.g. MWD/LWD and RSS) allows to change some configurations in these tools (IE setting of sensor or acquisition system in these tools) as well as transmitting some commands to these tools (e.g inclination and azimuth to RSS 859, or special acquisition sequence of LWD tools).

In at least one embodiment, there may be a wet, stabbable electrical coupler between the junction modules 866, 870 and the fishing module 868, 872. The coupler may be an inductive coupler such as a LWD data latch. Telemetry through the coupler may be conducted at high frequencies (e.g., above 50 kilohertz). Power (e.g., AC power) may be transmitted through the coupler at a lower frequency such 50 or 60 hertz.

In some embodiments, one or more of the sections of the instrument line may be installed in the wellbore 106 while one or more sections are removed from the wellbore 106. For example, one or more anchors may be set for the junction module 866, 870. The fishing module 868 may be disconnected from the junction module 870 after the anchors of the junction module 870 are set. The first section 852 (or first section 852 and second section 854) of the instrument line may then be tripped out of the wellbore 106. Similar process may apply at the lower fishing module 872) and junction module 870.

One or more of the sections of the instrument line may be removed from the wellbore 106. The removed section may be in the range of the bit drilled interval. This may be, for example, 4000 feet. This may occur in vertical and/or low inclination portions of the wellbore, as opposed to horizontal portions. Although 3 sections of the instrument line are shown, it will be appreciated that more sections may be used (e.g., 5 sections). The instrument lines may have the same length or different lengths.

To place a section of the instrument line within the drill string 104, a centralizer may be used for the first section 852 of the instrument line or associated devices (e.g., 816,818), the second section 854 of the instrument line or associated devices (e.g., 870,872, 878), the third section 856 of the instrument line, the junction module 866, 870, or the fishing module 868, 872. The centralizer may be a bow-spring centralizer. The centralizer may generate at least some radial pre-compression. The centralizer may keep the sections of the instrument line positioned in the center of the drill string 104. This may allow for no (or minimal) contact between the sections of the instrument line and the drill string 104. The centralizer may also prevent the sections of the instrument line from whirling in horizontal portions of the wellbore 106. As such, it may also prevent damage to the sections of the instrument line due to rotary friction. The centralizer may deform to become substantially flat. The centralizer may have a substantially smooth leading edge. In at least one embodiment, the centralizer may be run through the sealing system 220 when being run into the wellbore 106.

Figure 9:
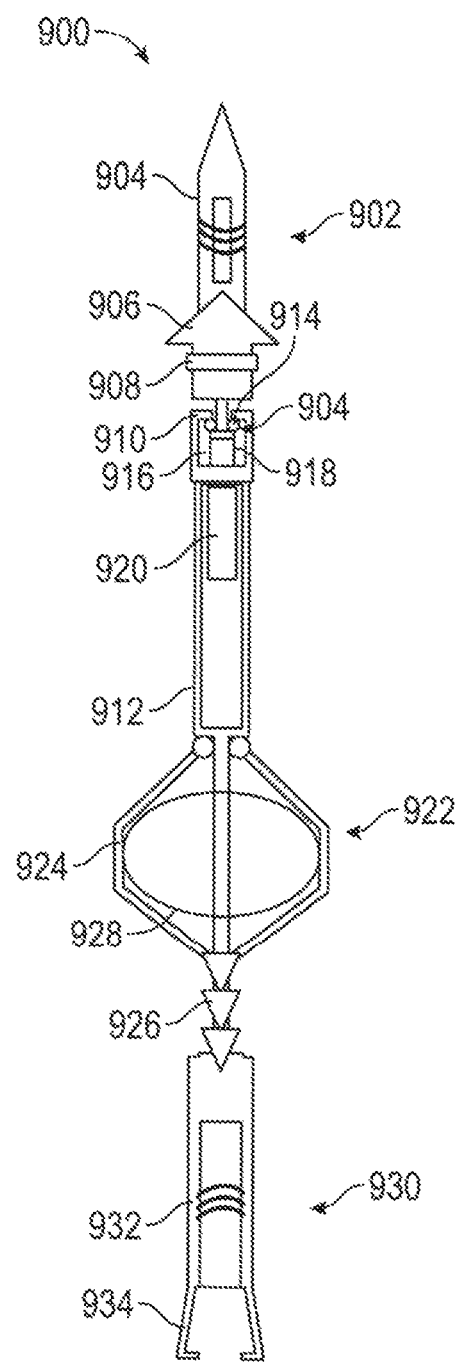
FIG. 9 illustrates a conceptual, side, schematic view of a junction module as a network node, according to an embodiment.

FIG. 9 illustrates a conceptual, side, schematic view of a junction module 900 as a network node, according to an embodiment. As illustrated, the junction module 900 may include an upper section 902. The upper section 902 may include an inductive coupler 904 (male part), fishing neck 906, and an un-coupler 908. The inductive coupler 904 can be configured to inductively transfer signal and/or power to and from the junction module 900. The fishing neck 906 can be configured to provide connection point for the upper end of the junction module 900. For example, the fishing neck 906 may provide a connection point for fishing tools, instrument lines, junction modules, and the like. The uncoupler 908 can be configured to uncouple devices from the fishing neck 906, as discussed further below.

The junction module 900 may include a swivel 910 coupled to a lower portion of the upper section 902. The swivel 910 may be positioned between the upper section 902 and the electronics section 912. The swivel 910 may allow the junction module 900 to rotate while sections of the instrument line, connected to the junction module, do not rotate. This may allow the junction module 900 to rotate with the drill string 104.

The swivel 910 may also support the axial load generated by the junction module 900 or sections of the instrument line. For example, the swivel 910 may include thrust bearing 914. The swivel 910 may also include lubrication 916 (e.g. oil) within a cavity of the swivel 910 and surround the thrust bearing 914. The swivel 910 may also include rotary connection 918. The rotary connection 918 may allow for transmission of signal and/or power transmission for each wire in the instrument line and for grounding the tubing. For example, the rotary connection 918 may be rotary contact or a rotary split transformer.

The electronics section 912 may include any electronics or electrical components requirement during the operations. The electronics section 912 may be sealed against the down-hole pressure to allow the operations of the electronics or electrical components, for example, approximately atmospheric pressure. For example, the electronics section 912 may include logging tools, MWD telemetry tools (described above), control modules, communication devices, and the like. For example, the electronics section 912 may also include a network node. The network node may be used to decode and re-encode in one or two directions, for example, data transmitted downhole from the surface and/or data received from instruments in the wellbore 106 and transmitted to the surface. Data collected from LWD/MWD type measurements within the electronics section may also be added to the data transmitted by the network node. For example, data from an accelerometer or a magnetometer (e.g., for rotation) may be added to the data that is decoded or re-encoded. In another example, data relating to pipe stretch and twist may be added to the data that is decoded or re-encoded. The electronics section 912 may also include a power source 920. The power source 920 may be any type of power source such as a battery, a rechargeable battery, and the like. For example, the power may be supplied through the instrument line to charge the power source and provide power to the electronics section 912 and other components in the wellbore 106, for example, the BHA. The power source may provide power if the junction module 900 is disconnected from the surface.

The junction module 900 may include an anchor section 922. The anchor section 922 may be configured to anchor the junction module 900 (and any attached sections of instrument line) to an interior of the drill string 104. The anchor section 922 may include one or more articulated anchors 924, one or more solenoids 926, and one or more biasing members 928. The articulated anchors 924 may be configured to expand radially-outward and engage with the interior surface of the drill string 104. In some embodiments, the articulated anchors 924 may be configured to contract upon contact with a shoulder or other member inside the drill string 104. The solenoids 926 may be configured to cause the articulated anchors 924 to expand or contract by moving the instrument axially in the bore of the drill-sting 104, and lock the articulated anchors 924 in a position. The biasing member 928, for example, bow springs, may provide force radially-outward on the articulated anchors 924. In some embodiments, the biasing member 928 may be removed and solenoids 926 or other motors may provide a force radially-outward on the articulated anchors 924. The articulate anchors 924 has such bidirectional design so that when the junction module 900 moves axially in the bore of the drill-string, the anchor (when not set and not locked by the solenoid) may retract when the extremity of the anchor enters in contact with a change of diameter in the drill-sting (such as shoulder or change of bore in the drill-pipe tool-joint).

The junction module 900 may include a lower section 930. The lower section 930 can include an inductive coupler 932 (female part) and one or more grabbing fingers 934. The inductive coupler 932 can be configured to inductively transfer signal and/or power to and from the junction module 900. The grabbing fingers 934 can be configured to provide connection point for the lower end of the junction module 900. For example, the fishing neck 906 may provide a connection point for fishing tools, instrument lines, junction modules, and the like.

While described above as having a "male" connection in the upper end of the junction module 900 and a "female" connection as the lower end of the junction module 900, the junction module 900 may have "female" connection in the upper end of the junction module 900 and a "male" connection as the lower end of the junction module 900.

In examples described above, the junction module 900 may be decoupled from the instrument line 120. This may be done via network control or slick-line mechanical techniques. Once decoupled, the instrument line 120 may be retrieved at the pipe connection.

Figure 10A:
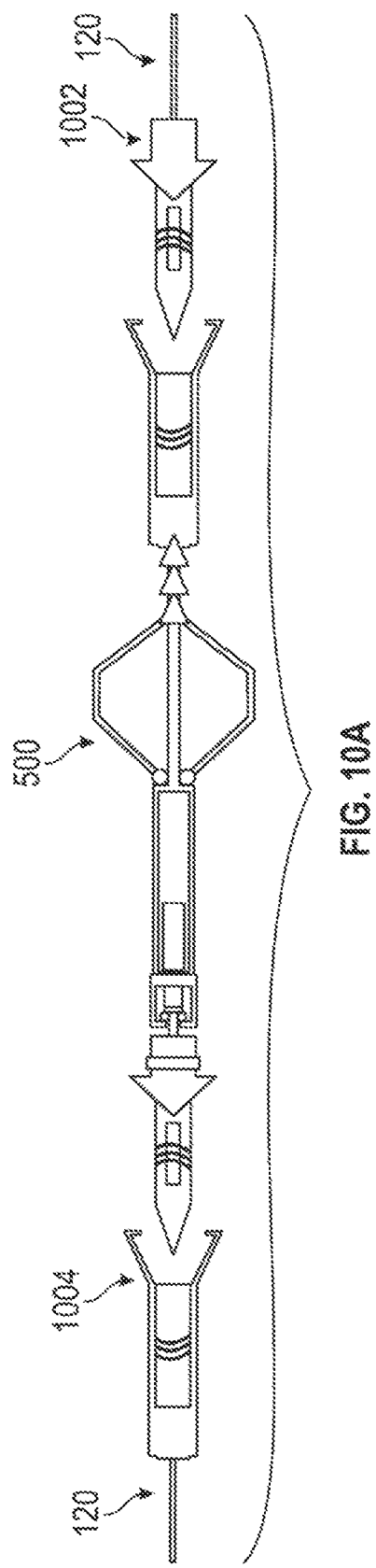
FIGS. 10A and 10B illustrate conceptual, side, schematic views of a connection between the junction module and instrument lines, according to an embodiment.
Figure 10B:
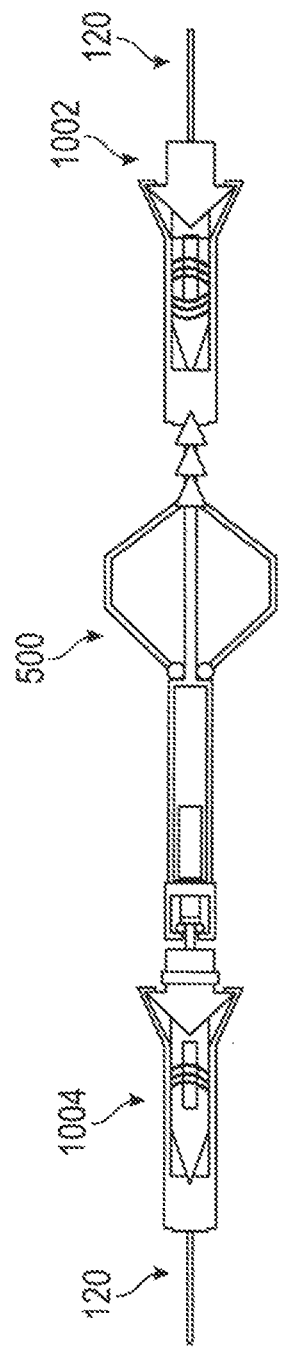

FIGS. 10A and 10B illustrate conceptual, side, schematic views of a connection between the junction module 900 and instrument lines, according to an embodiment. More particularly, FIG. 10A shows the lower end of one section of the instrument line 120 decoupled from the upper end of the junction module 900, and the lower end of the junction module 900 decoupled from the upper end of another section of the instrument line 120. The lower end of one section of the instrument line 120 having a female fishing tool 1004 coupled thereto and the upper end of another section of the communication cable having a male fishing neck 1002 coupled thereto. As illustrated FIG. 10B shows the lower end of one section of the instrument line 120 coupled to the upper end of the junction module 900, and the lower end of the junction module 900 coupled to the upper end of another section of the instrument line 120. The instrument line 120 may have a fishing tool coupled thereto. The fishing tool at the "active inserted line" may be decoupled in the wellbore 106.

The communication line and the junction module may form or include a network with a repeater. This may be a similar configuration as the multiple sections of the communication line discussed above. There may be a continuous data-latch to measuring-while-drilling and logging-while-drilling. This may enable the detection of faults in the network.

Figure 11A:
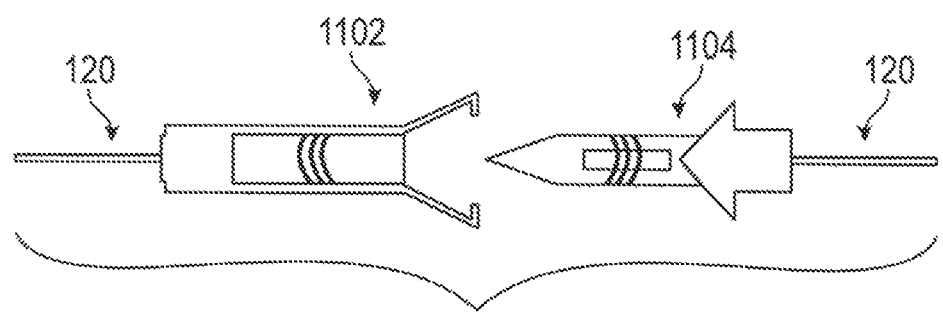
FIGS. 11A and 11B illustrate conceptual, side, schematic views of a passive connection between junction modules and instrument lines, according to an embodiment.
Figure 11B:
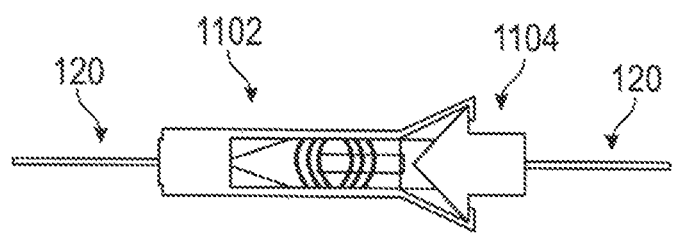

FIGS. 11A and 11B illustrate conceptual, side, schematic views of a passive connection between junction modules and instrument lines, according to an embodiment. More particularly, FIG. 11A shows the lower end of one section of the instrument line 120 having a female fishing tool 1102 coupled thereto and the upper end of another section of the communication cable having a male fishing neck 1104 coupled thereto. As illustrated in FIG. 11B, the female fishing tool 1102 may couple to the male fishing neck 1102. The female fishing tool 1102 may couple to the male fishing neck 1102 may include inductive couplers to inductively transfer signal and/or power between the instrument lines 120. The embodiment shown in FIGS. 11A and 11B may provide more attenuation.

Figure 12A:
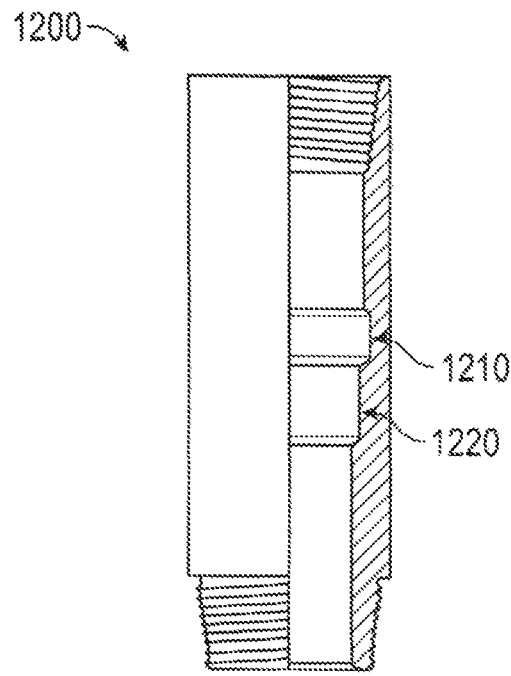
FIGS. 12A and 12B illustrate partial cross-sectional views of examples of a locating module, according to an embodiment.
Figure 12B:
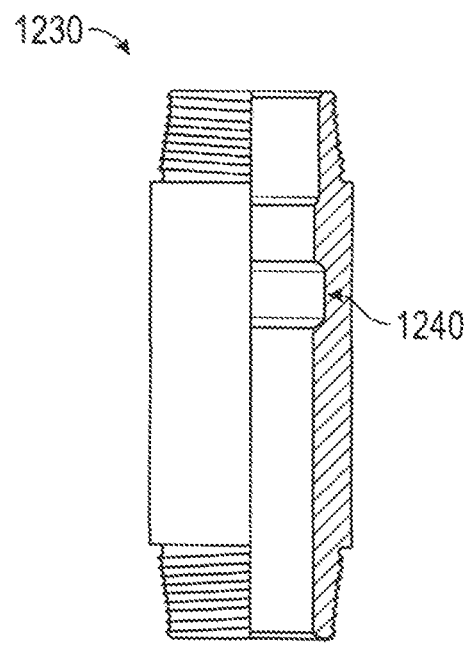

FIGS. 12A and 12B illustrate partial cross-sectional views of examples of a locating module, according to an embodiment. FIG. 12A illustrates a partial cross-sectional view of examples of a locating module 1200, according to an embodiment. The locating module 1200 may include landing groove 1210. A latching dog may be installed on the of the junction module 900 (as illustrated in FIG. 9) and replace the anchor 922 (as illustrated in FIG. 9) and may allow locking of the latching dog in a landing groove 1210 on the locating module 1200. The latching dog may be released when desired by an operator at the surface: the latching dog is then radially pushed against the bore of the drill-sting 104 to possibly enter into the landing groove 1210 of the locating module 1200 when the junction module 900 passes across the locating module 1200. With locating module 1200, the latching dog may be released when the junction module 900 is still above the locating module 1200. The latching dogs will stop against an axial stop 1220 of the locating module 1200. The release mechanism may be triggered via telemetry (e.g., from the surface). This may include a one time activation, and it may be reset manually. The latching dog may be chamfered so that the junction module 900 may be pulled upwards in the drill-string without catching upon an obstruction in the bore of the drill-sting 104.

FIG. 12B illustrates a partial cross-sectional view of examples of a locating module 1230, according to an embodiment. The locating module 1230 may include landing groove 1240. A latching dog may be installed on the of the junction module 900 (as illustrated in FIG. 9) and replace the anchor 922 (as illustrated in FIG. 9) and may allow locking of the latching dog in a landing groove 1240 on the locating module 1230. The latching dog may be released when desired by an operator at the surface: the latching dog is then radially pushed against the bore of the drill-sting 104 to possibly enter into the landing groove 1240 of the locating module 1230 when the junction module 900 passes across the locating module 1230. With locating module 1230, the latching dog may be released when the junction module 900 is still above the locating module 1230. The latching dogs will stop against an axial stop 1220 of the locating module 1230. The release mechanism may be triggered via telemetry (e.g., from the surface). This may include a one time activation, and it may be reset manually. The latching dog may be chamfered so that the junction module 900 may be pulled upwards in the drill-string without catching upon an obstruction in the bore of the drill-sting 104. With the locating module 1230, The release may be triggered when the latching dog of the junction module 900 has passed below the locating module 1230. The release mechanism may be triggered via telemetry (e.g., from the surface). This may include a one time activation, and it may be reset manually. The latching dog may be chamfered so that the junction module 900 may be pulled upwards in the drill-string without catching upon an obstruction in the bore of the drill-sting 104.

The locating module 1200 or 1230 may be designed as part of the drill-string 104. The junction module 900 may be configured to latch or couple into the locating module. A different section of the instrument line may "hang" from the bottom of the network module. A "coiled pig tail" may be positioned at the lower end of each section of the instrument line. The pig tail may be a coil and/or spring that account for the mismatch in length between the instrument line and the distance between successive locating modules of the drill string. When using locating module 1200 or 1230, the bore of the locating module may be larger than the bore of the drill-sting 104. This provides more annular space between the junction module 900 and the bore of the locating module 1200 or 1230 so that the mud flow does not have too high velocity and floor erosion is limited.

Figure 13:
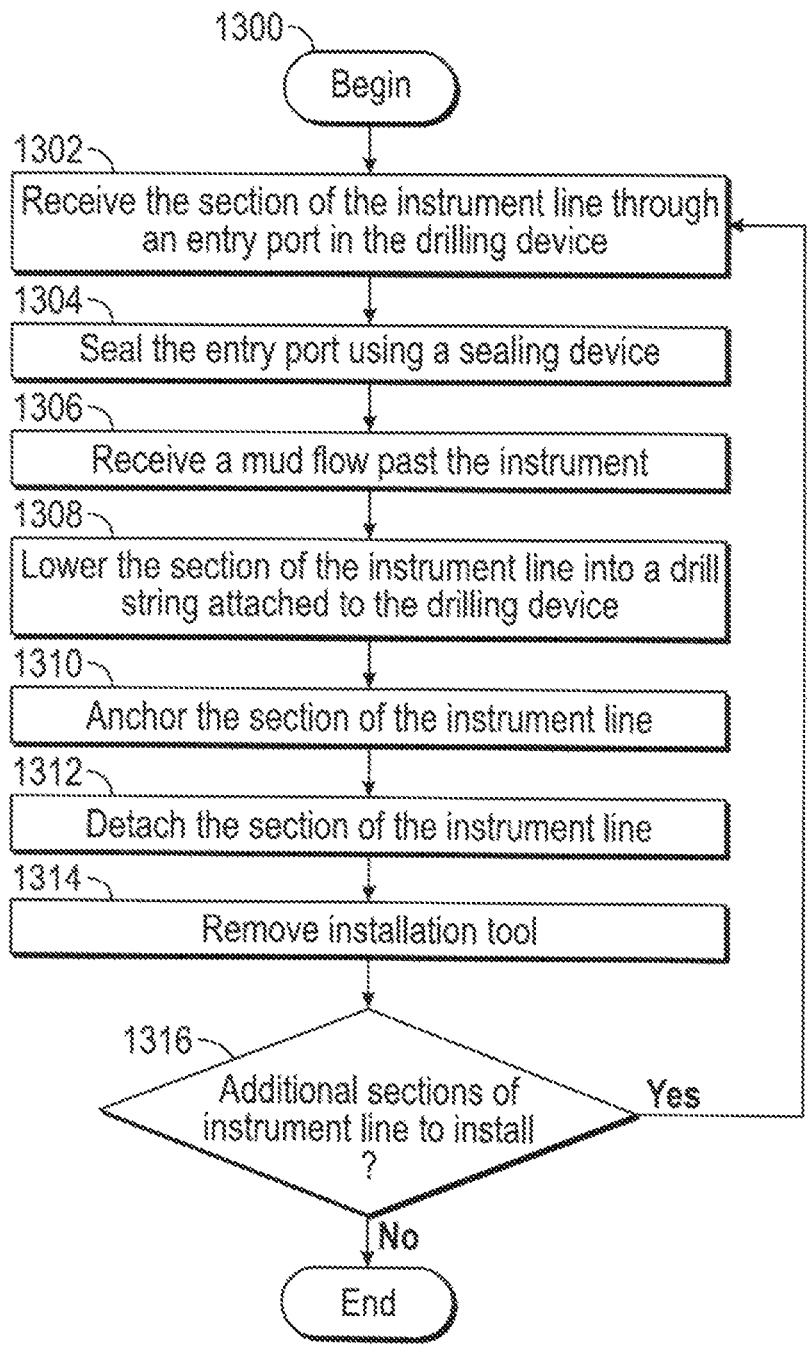
FIG. 13 illustrates a flowchart of a method for deploying a multi-section instrument line within a drill string, according to an embodiment.

FIG. 13 illustrates a flowchart of a method 1300 for deploying an instrument line with multiple lines into the drill string 104 deployed into the wellbore 106, according to an embodiment. For example, the method 1300 may be utilized to deploy include an instrument line described above in FIGS. 8A and 8B. Although the present method 1300 is described with reference to the drilling rig 100 discussed above, it will be appreciated that this is merely an example, and embodiments of the method 1300 may be applied using other structures. Moreover, additional action may be preformed during method 1300, for example, those described for method 700

The method 1300 may begin with receiving a section of an instrument line in the drilling device 200, as at 702. This may include, for example, receiving the section of the instrument line 120 (and optionally an instrument) down between the sheaves of the crown block 112, between the sheaves of the travelling block 105, through the line-pusher 265, through the sealing device 220, and into the entry port 210 of the housing 202. In a specific embodiment, the section of the instrument line 120 may be positioned in the interior 250 of the shaft 204, or in the conduit 253.

The method 1300 may also include sealing the entry port 210 using the sealing device 220, as at 1304. For example, the annular seal 300 of the sealing device 220 may extend radially inward from an open position, which allows the instrument 126 to pass through, to a first, sealed configuration, in which the annular seal 300 engages and seals with the instrument line 120.

The method 1300 may include receiving a flow of mud past the section of the instrument line 120, as at 1306. The method 1300 may then proceed to lowering the section of the instrument line 120 into the drill string 104, as at 1308. At least a part of this lowering may be accomplished by pushing the section of the instrument line 120 using the line-pusher 265, although at least a part of this pushing may also or instead rely on mud pressure. Further, the section of the instrument line 120 may be lowered (e.g., pushed) to a predetermined depth within the drill string 104. In addition, while the instrument 126 is being lowered, the instrument line spool 122 may unspool the section of the instrument line 120 therefrom, so as to allow the line 116 to be extended down into the drill string 104. The unspooling of the instrument line 120 may be coordinated, e.g., synchronized, with the pushing by the line-pusher 265. Reverse process may be considered to extract the instrument line and associated junction module and tools out of the drill-string.

Once the section of the instrument line is positioned, the method 1300 may include anchoring the section of the instrument line, as at 1310. For example, anchoring devices of the instrument line may be activated to anchor the instrument line to the interior of the drill string 104. The anchoring devices may be activated by electrical signals from the surface and/or activated by mechanical devices.

For example, referring to FIG. 9, the junction module 900 may include the anchor section 922 may include one or more articulated anchors 924, one or more solenoids 926, and one or more biasing members 928. Once activated, the solenoids 926 may cause the articulated anchors 924 to expand and lock the articulated anchors 924 in a position. The biasing member 928, for example, bow springs, may provide force radially-outward on the articulated anchors 924.

The method 1300 may include detaching the section of the instrument line, as at 1312. An installation tool used to deliver the instrument line may be detached from the section of the instrument line. The detachment may be activated by electrical signals from the surface and/or activated by mechanical devices.

For example, referring to FIGS. 9, 10A, and 10B, the female fishing tool 1004 may be coupled to the junction module 900 at the fishing neck 906. Once activated, the un-coupler 908 may force the grabbing fingers of the female fishing tool 1104 apart so that female fishing tool 1104 can be decoupled from the fishing neck 906.

The method 1300 may include removing the installation tool, as at 1314. The method 1300 may include determining if additional sections of instrument line should be installed, as at 1316. If additional sections are to be installed, the method 1300 may return to 1302.

Figure 14:
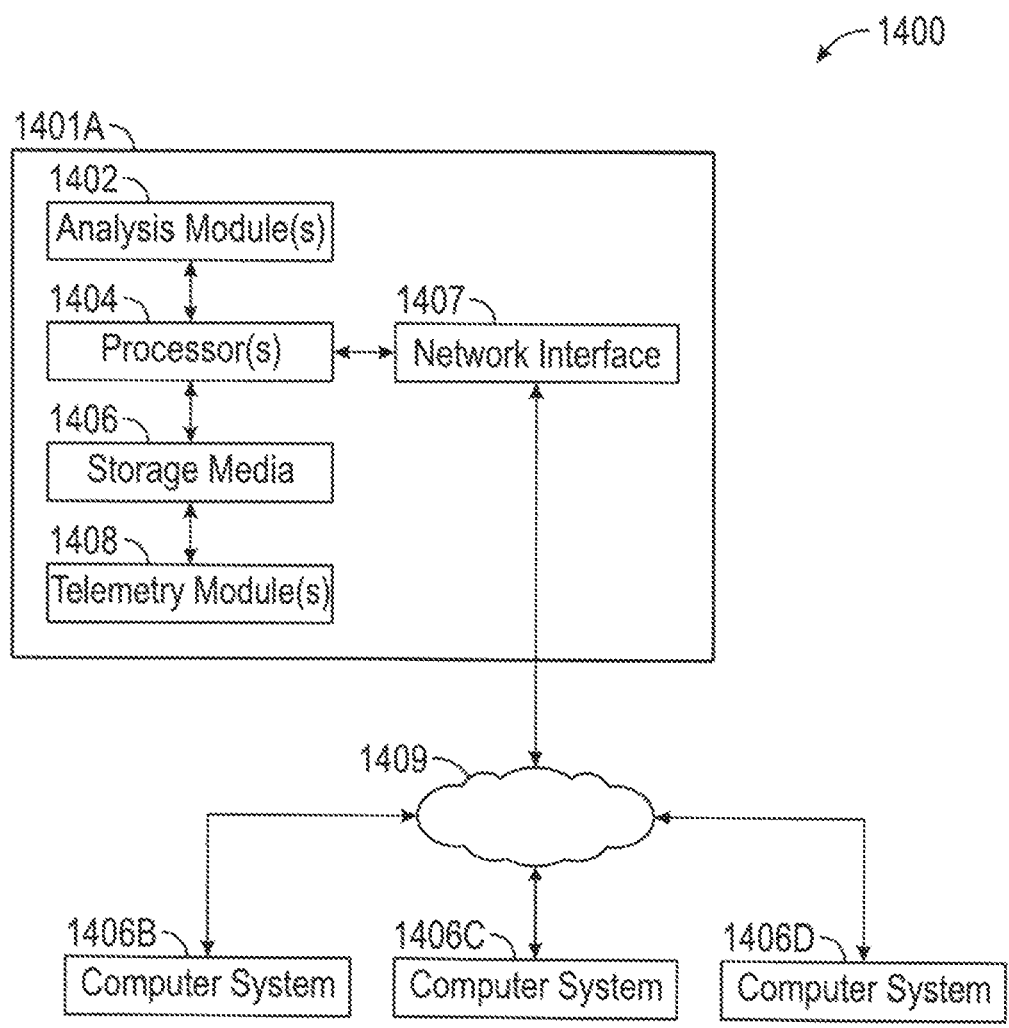
FIG. 14 illustrates a schematic view of a computing system, according to an embodiment.

In some embodiments, the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 507 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 501A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor may include a microprocessor, microcontroller, processor module or subsystem, programmable integrated circuit, programmable gate array, or another control or computing device.

The storage media 1406 may be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1400 contains one or more rig control module(s) 1408. In the example of computing system 1400, computer system 1401A includes the rig control module 1408. In some embodiments, a single rig control module may be used to perform some or all aspects of one or more embodiments of the methods disclosed herein. In alternate embodiments, a plurality of rig control modules may be used to perform some or all aspects of methods herein.

The computing system 1400 is one example of a computing system; in other examples, the computing system 1400 may have more or fewer components than shown, may combine additional components not depicted in the example embodiment of FIG. 14, and/or the computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. An apparatus comprising:
  a junction module comprising:
    an upper section comprising:

a fishing neck for mechanically connecting with a fishing tool conveyed in a drill string by an instrument line; and a first inductive coupler operable, via the mechanical connection between the fishing neck with the fishing tool, to inductively transfer:
electrical power from a second inductive coupler of the fishing tool; and
electrical signals from and to the second inductive coupler;

an electronics section comprising electronics of a downhole tool, wherein the downhole tool is selected from the group consisting of:
a logging-while-drilling (LWD) tool;
a measurement-while-drilling (MWD) tool; and
a logging device comprising one or more geophones, acoustic receivers, torque sensors, strain gauges, accelerometers, gyroscopes, current probes, and/or voltmeters; and a swivel mechanically and electrically connecting the electronics section to the upper section while permitting relative rotation of the electronics section and the upper section within the drill string.

2. The apparatus of claim 1 wherein the swivel comprises a thrust bearing supporting an axial load generated by the electronics section.

3. The apparatus of claim 2 wherein the electronics section further comprises a network node operable to decode and re-encode data transmitted to and from the downhole tool.

4. The apparatus of claim 3 wherein:
the electronics section further comprises a power source comprising a battery;
the electronics of the electronics section are powered by first electrical power supplied through the instrument line and the swivel, when the first electrical power is available; and
the electronics of the electronics section are powered by second electrical power supplied by the battery when the first electrical power is not available.

5. The apparatus of claim 4 wherein the junction module further comprises an anchor section comprising an articulated anchor coupled to an end of the electronics section opposite the swivel, and wherein the articulated anchor is operable to expand radially-outward and engage with an interior surface of the drill string.

6. The apparatus of claim 5 wherein the anchor section further comprises a solenoid operable to lock the articulated anchor in engagement with the interior surface of the drill string.

7. The apparatus of claim 6 wherein the anchor section further comprises a biasing member providing radially-outward force on the articulated anchor.

8. The apparatus of claim 7 wherein axial movement of the junction module within the drill string retracts the articulated anchor when extremities of the articulated anchor enters into contact with a change of inner diameter of the drill sting.

9. The apparatus of claim 8 wherein:
the fishing neck is a first fishing neck;
the fishing tool is a first fishing tool;
the instrument line is a first instrument line;
the junction module further comprises a lower section;
the anchor section is mechanically and electrically connected between the upper section and the lower section; and
the lower section comprises:
a second fishing tool for mechanically connecting with a second fishing neck associated with a second instrument line in the drill string; and
a third inductive coupler operable, via the mechanical connection between the second fishing tool with the second fishing neck, to inductively transfer:
electrical power from a fourth inductive coupler of the second fishing neck; and
electrical signals from and to the fourth inductive coupler.

10. The apparatus of claim 5 wherein:
the fishing neck is a first fishing neck;
the fishing tool is a first fishing tool;
the instrument line is a first instrument line;
the junction module further comprises a lower section;
the anchor section is mechanically and electrically connected between the upper section and the lower section; and
the lower section comprises:
a second fishing tool for mechanically connecting with a second fishing neck associated with a second instrument line in the drill string; and
a third inductive coupler operable, via the mechanical connection between the second fishing tool with the second fishing neck, to inductively transfer:
electrical power from a fourth inductive coupler of the second fishing neck; and
electrical signals from and to the fourth inductive coupler.

11. The apparatus of claim 1 wherein the fishing tool is conveyed in the drill string via spooling/unspooling of the instrument line onto/from an instrument line spool of a drilling rig while the drill string extends from the drilling rig downhole into a wellbore.

12. The apparatus of claim 11 further comprising the drilling rig.

* * * * *